US012671614B2

(12) United States Patent (10) Patent No.: US 12,671,614 B2
Liu et al. (45) Date of Patent: Jun. 30, 2026

(54) COMMUNICATION METHOD AND APPARATUS

(71) Applicant: Huawei Technologies Co., Ltd., Shenzhen (CN)

(72) Inventors: Fengwei Liu, Chengdu (CN); Minghui Xu, Shenzhen (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 18/597,437

(22) Filed: Mar. 6, 2024

(65) Prior Publication Data

US 2024/0214253 A1     Jun. 27, 2024

Related U.S. Application Data

(63) Continuation of application No. PCT/CN2022/116602, filed on Sep. 1, 2022.

(30) Foreign Application Priority Data

Sep. 7, 2021    (CN) .......................... 202111044235.7

(51) Int. Cl.
        *H04L 27/26*          (2006.01)
(52) U.S. Cl.
        CPC .... *H04L 27/2607* (2013.01); *H04L 27/26025* (2021.01)
(58) Field of Classification Search
        CPC ........... H04L 27/2607; H04L 27/26025; H04L 27/26132; H04L 27/261; H04L 27/2647; H04L 27/2665; H04L 27/2695; H04L 27/2602
        See application file for complete search history.

(56) References Cited

U.S. PATENT DOCUMENTS

| | | | |
|---|---|---|---|
| 2009/0161789 A1* | 6/2009 | Imamura ............. | H04L 27/2607 375/295 |
| 2015/0156045 A1* | 6/2015 | Lee ..................... | H04L 27/2607 375/260 |
| 2017/0339697 A1* | 11/2017 | Park ...................... | H04L 5/0007 |
| 2019/0081841 A1* | 3/2019 | Kim ...................... | H04L 5/0053 |
| 2021/0328743 A1* | 10/2021 | Sun ..................... | H04L 27/2636 |
| 2023/0060054 A1* | 2/2023 | Zhang ................. | H04L 27/2607 |
| 2023/0069330 A1* | 3/2023 | Ma ..................... | H04L 27/26134 |

FOREIGN PATENT DOCUMENTS

| | | |
|---|---|---|
| EP | 3962007 A1 | 3/2022 |
| WO | 2021000711 A1 | 1/2021 |

* cited by examiner

*Primary Examiner* — Jung H Park
(74) *Attorney, Agent, or Firm* — Slater Matsil, LLP

(57) ABSTRACT

A communication method and apparatus are provided. A terminal obtains first information and second information, the first information is used to determine a length of a first-type symbol component, the second information is used to determine at least one of a length of a second-type symbol component and a length of a third-type symbol component, and the length of the first-type symbol component is greater than the length of the third-type symbol component. The terminal determines a plurality of signal blocks based on the first information and the second information, and processes each of the plurality of signal blocks to obtain an OFDM symbol corresponding to the signal block and sends the OFDM symbol.

20 Claims, 12 Drawing Sheets eMBB

Multi-site
transmission

Backhaul

D2D

COMMUNICATION METHOD AND APPARATUS

CROSS-REFERENCE TO RELATED APPLICATIONS

This application is a continuation of International Application No. PCT/CN2022/116602, filed on Sep. 1, 2022, which claims priority to Chinese Patent Application No. 202111044235.7, filed on Sep. 7, 2021. The disclosures of the aforementioned applications are hereby incorporated by reference in their entireties.

TECHNICAL FIELD

Embodiments of this application relate to the wireless communication field, and in particular, to a communication method and apparatus.

BACKGROUND

To resist a multipath effect of a channel, a technology of adding a guard interval between symbols is proposed. The guard interval may resist the multipath effect in the following manner.

First, the guard interval can eliminate inter-symbol interference (ISI) between adjacent received symbols.

Second, after passing through a multipath channel, the guard interval converts a linear convolution of the channel and a symbol into a cyclic convolution of the channel and the symbol. After a received signal is converted into a cyclic convolution of a symbol and the multipath channel, a symbol receive end can eliminate the multipath effect by using a frequency domain equalization method.

The guard interval may be zero padding (ZP), a cyclic prefix (CP), or a cyclic suffix (CS). Usually, the cyclic prefix (CP) is used as the guard interval between the symbols. An existing CP configuration method can resist part of impact of the multipath effect. However, in an actual environment, there may be a path (path P for short) whose delay difference with a first path exceeds a CP length. It may be understood that, for a same sent signal, a difference between a moment at which the sent signal arrives at the receive end through the first path and a moment at which the sent signal arrives at the receive end through the path P exceeds duration of the CP, and the moment at which the sent signal arrives at the receive end through the first path is earlier than a moment at which the sent signal arrives at the receive end through another path.

Received signals corresponding to the path P cannot completely fall into a conventional fast Fourier transform (FFT) receive window. In other words, a part of the signals that arrive at the receive end through the path P is lost. In addition, a signal that arrives at the receive end through the path P in a previous slot is further received in a conventional FFT receive window of a first OFDM symbol. The longer a delay difference between the path P and the first path, the more signals that arrive through the path P are lost, and the more interference from received signals that arrive through the path P in the previous slot. When there are enough lost signals and enough interference, performance of the first OFDM symbol may be affected.

SUMMARY

Embodiments of this application provide a communication method and apparatus, to ensure performance of a first OFDM symbol when a delay difference between a path P and a first path exceeds a CP length.

According to a first aspect, this application provides a communication method. The method includes: A terminal device obtains first information and second information, where the first information is used to determine a length of a first-type symbol component, the second information is used to determine at least one of a length of a second-type symbol component and a length of a third-type symbol component, and the length of the first-type symbol component is greater than the length of the third-type symbol component. The terminal device determines a plurality of signal blocks based on the first information and the second information, where each signal block includes a plurality of modulation symbols; processes each of the plurality of signal blocks to obtain an OFDM symbol corresponding to the signal block; and sends the OFDM symbol, where a first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k \geq 2$, and k is an integer.

According to the foregoing method, an FFT receive window corresponding to a first OFDM symbol may be delayed backwards compared with a conventional FFT receive window, so that signals that arrive at the first OFDM symbol through a path P may completely fall into the FFT receive window, to reduce inter-symbol interference on the first OFDM symbol. When the first OFDM symbol is a DMRS symbol, accuracy of channel estimation based on DMRS estimation is ensured, to further ensure modulation performance.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1. A second-type symbol component in a $(k-1)^{th}$ signal block is last Y modulation symbols in the $(k-1)^{th}$ signal block, and in the $k^{th}$ signal block, there are m modulation symbols between an end modulation symbol of modulation symbols that are the same as the modulation symbols in the second-type symbol component in the $(k-1)^{th}$ signal block and a last modulation symbol of the $k^{th}$ signal block, where Y≥1. The third-type symbol component in the $k^{th}$ signal block is first Z modulation symbols in the $k^{th}$ signal block, Z<X, Z≥1, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, the length of the third-type symbol component is a first preset value, and the second information indicates a sum of the length of the second-type symbol component and a length of the cyclic prefix.

According to the foregoing design, the second information may be carried or indicated by reusing an existing field or adding a new field, so that lengths of a plurality of types of second-type symbol components can be indicated.

In a possible design, the first information indicates a difference between the length of the first-type symbol component and the length of the third-type symbol component.

According to the foregoing design, the first-type symbol component can be configured by indicating the difference between the length of the first-type symbol component and the length of the third-type symbol component or a difference between a length index of the first-type symbol component and a length index of the third-type symbol component, and the method is simple.

In a possible design, when the terminal device determines the plurality of signal blocks based on the first information and the second information, the terminal device determines a size of a transport block based on the first information and the second information, and the terminal device determines, based on the size of the transport block, a plurality of signal blocks corresponding to third information, where the third information is information that needs to be sent by the terminal device to the network device.

In a possible design, when the terminal device determines the size of the transport block based on the first information and the second information, the terminal device determines, based on the length of the first-type symbol component, a quantity of modulation symbols included in the first-type symbol component; determines, based on the length of the second-type symbol component, a quantity of modulation symbols included in the second-type symbol component; and determines, based on the length of the third-type symbol component, a quantity of modulation symbols included in the third-type symbol component. The terminal device determines a first resource element quantity based on the quantity of modulation symbols included in the first-type symbol component, the quantity of modulation symbols included in the second-type symbol component, and the quantity of modulation symbols included in the third-type symbol component, where the first resource element quantity indicates a quantity of resource elements corresponding to a same modulation symbol between different signal blocks in one slot. The terminal device determines the size of the transport block based on a second resource element quantity and the first resource element quantity, where the second resource element quantity is a quantity of resource elements used to transmit the third information in one slot.

According to the foregoing design, when the size of the transport block is re-determined, a resource reserved for inter-block replication is considered, so that a difference between an actual code rate and a configured code rate can be within a specific range, to ensure demodulation performance.

In a possible design, the terminal device may determine the size of the transport block based on the second resource element quantity and the first resource element quantity in but not limited to the following manners: The terminal device determines the size of the transport block based on a difference between the second resource element quantity and the first resource element quantity; or the terminal device determines the size of the transport block based on a difference between the second resource element quantity and a first quantized value, where the first quantized value is obtained after the first resource element quantity is quantized at a preset spacing According to the foregoing design, when the size of the transport block is calculated, the resource reserved for inter-block replication is considered, so that demodulation performance can be further ensured.

In a possible design, a unit of the length of the first-type symbol component is a quantity of sampling points obtained after IFFT, or an absolute time unit, or a quantity of sampling points obtained after IFFT is performed by using FFT points of a specified quantity; a unit of the length of the second-type symbol component is a quantity of sampling points obtained after IFFT, or an absolute time unit, or a quantity of sampling points obtained after IFFT is performed by using FFT points of a specified quantity; and a unit of the length of the third-type symbol component is a quantity of sampling points obtained after IFFT, or an absolute time unit, or a quantity of sampling points obtained after IFFT is performed by using FFT points of a specified quantity.

According to a second aspect, this application provides a communication method. The method includes: A network device sends first information and second information to a terminal device, where the first information is used to determine a length of a first-type symbol component, the second information is used to determine at least one of a length of a second-type symbol component and a length of a third-type symbol component, and the length of the first-type symbol component is greater than the length of the third-type symbol component. The network device receives a plurality of OFDM symbols from the terminal device, determines a receive window corresponding to each of the plurality of OFDM symbols, and obtains a demodulation signal of each OFDM symbol based on the receive window corresponding to each OFDM symbol. The plurality of OFDM symbols are in a one-to-one correspondence with a plurality of signal blocks, each signal block includes a plurality of modulation symbols, a first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k \geq 2$, and k is an integer.

According to the foregoing method, an FFT receive window corresponding to a first OFDM symbol may be delayed backwards compared with a conventional FFT receive window, so that all signals that arrive at the first OFDM symbol through a path P may completely fall into the FFT receive window, to reduce inter-symbol interference on the first OFDM symbol. When the first OFDM symbol is a DMRS symbol, accuracy of channel estimation based on DMRS estimation is ensured, to further ensure modulation performance.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1. A second-type symbol component in a $(k−1)^{th}$ signal block is last Y modulation symbols in the $(k−1)^{th}$ signal block, and in the $k^{th}$ signal block, there are m modulation symbols between an end modulation symbol of modulation symbols that are the same as the modulation symbols in the second-type symbol component in the $(k−1)^{th}$ signal block and a last modulation symbol of the $k^{th}$ signal block, where Y≥1. The third-type symbol component in the $k^{th}$ signal block is first Z modulation symbols in the $k^{th}$ signal block, Z<X, Z≥1, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, when the network device determines the receive window corresponding to each of the plurality of OFDM symbols, the network device determines, based on the length of the first-type symbol component, a receive window corresponding to a first OFDM symbol in the plurality of OFDM symbols, where a start point of the receive window corresponding to the first OFDM symbol is associated with the length of the first-type symbol component; and determines, based on the duration of the cyclic prefix, a receive window corresponding to a $k^{th}$ OFDM symbol. A spacing between an end point of the receive window corresponding to the first OFDM symbol and a start point of a receive window corresponding to a second OFDM symbol is T1 sampling points, a spacing between an end point of the receive window corresponding to the $k^{th}$ OFDM symbol and a start point of a receive window corresponding to a $(k+1)^{th}$ OFDM symbol is T2 sampling points, T1<T2, and T1 and T2 are positive integers.

According to the foregoing design, the receive window corresponding to the first OFDM symbol is delayed based on the length of the first-type symbol component, and a manner of determining a receive window of another OFDM symbol remains unchanged, so that inter-symbol interference on the first OFDM symbol can be reduced, and the solution is simple and easy to implement.

In a possible design, when the network device determines, based on the length of the first-type symbol component, the receive window corresponding to the first OFDM symbol in the plurality of OFDM symbols, the network device determines at least one candidate receive window based on the length of the first-type symbol component, and the network device determines, from the at least one candidate receive window based on a preset parameter, the receive window corresponding to the first OFDM symbol. A spacing between any two adjacent start points in start points of the at least one candidate receive window is $\Delta T$ sampling points, $\Delta T$ is a preset value, and $\Delta T$ is a positive integer.

According to the foregoing design, a receive window with better performance may be selected from a plurality of candidate receive windows as the receive window corresponding to the first OFDM symbol.

In a possible design, the network device determines, based on the demodulation signal of each OFDM symbol, a received signal of a signal block corresponding to each OFDM symbol; the network device demaps, based on the first information and the second information, the received signal of the signal block corresponding to each OFDM symbol; and the network device obtains received bit information based on a demapping result.

In a possible design, the network device may demap, based on the first information and the second information, the received signal of the signal block corresponding to each OFDM symbol in but not limited to the following manners.

Manner 1: The network device performs demapping based on a received signal corresponding to the first-type symbol component and a received signal corresponding to the second-type symbol component in received signals of the first signal block, and the network device performs demapping based on a received signal corresponding to the third-type symbol component and a received signal corresponding to the second-type symbol component in received signals of the $k^{th}$ signal block.

Manner 2: The network device performs demapping, based on a received signal corresponding to the first-type symbol component in the first signal block and a received signal corresponding to the second-type symbol component in the first signal block in received signals of the second signal block, and the network device performs demapping based on a received signal corresponding to the third-type symbol component in the $k^{th}$ signal block and a received signal corresponding to the second-type symbol component in the $k^{th}$ signal block in received signals of the $(k+1)^{th}$ signal block.

According to Manner 1 and Manner 2, a received signal of a modulation symbol corresponding to same information content needs to be demodulated only once, and demodulation does not need to be performed twice, so that demodulation efficiency can be improved.

Manner 3: The network device performs demapping based on an average value between a received signal corresponding to the first-type symbol component in received signals of the first signal block and a received signal corresponding to the first-type symbol component in the first signal block in received signals of the second signal block and an average value between a received signal corresponding to the second-type symbol component in the received signals of the first signal block and a received signal corresponding to the second-type symbol component in the first signal block in the received signals of the second signal block, and performs demapping based on an average value between a received signal corresponding to the third-type symbol component in received signals of the $k^{th}$ signal block and a received signal corresponding to the third-type symbol component in the $k^{th}$ signal block in received signals of the $(k+1)^{th}$ signal block and an average value between a received signal corresponding to the second-type symbol component in the received signals of the $k^{th}$ signal block and a received signal corresponding to the second-type symbol component in the $k^{th}$ signal block in the received signals of the $(k+1)^{th}$ signal block.

According to Manner 3, demodulation is performed with reference to two parts of received signals of modulation symbols that correspond to same information content, so that a demodulation success rate can be improved.

Manner 4: When the network device determines that noise power of received signals of the $k^{th}$ signal block is lower than noise power of received signals of the $(k+1)^{th}$ signal block, the network device performs demapping based on a received signal corresponding to the third-type symbol component and a received signal corresponding to the second-type symbol component in the received signals of the $k^{th}$ signal block; or when the network device determines that noise power of received signals of the $k^{th}$ signal block is higher than noise power of received signals of the $(k+1)^{th}$ signal block, the network device performs demapping based on a received signal corresponding to the third-type symbol component in the $k^{th}$ signal block and a received signal corresponding to the second-type symbol component in the $k^{th}$ signal block in the received signals of the $(k+1)^{th}$ signal block.

According to Manner 4, received signals of a part of modulation symbols with lower noise power are selected for demodulation, so that a demodulation success rate can be increased.

In a possible design, the network device determines a size of a transport block based on the first information and the second information, and the network device decodes the received bit information based on the size of the transport block, to obtain third information, where the third information is information that needs to be sent by the terminal device to the network device.

In a possible design, when the network device determines the size of the transport block based on the first information and the second information, the network device determines, based on the length of the first-type symbol component, a quantity of modulation symbols included in the first-type symbol component; determines, based on the length of the second-type symbol component, a quantity of modulation symbols included in the second-type symbol component; and determines, based on the length of the third-type symbol component, a quantity of modulation symbols included in the third-type symbol component. The network device determines a first resource element quantity based on the quantity of modulation symbols included in the first-type symbol component, the quantity of modulation symbols included in the second-type symbol component, and the quantity of modulation symbols included in the third-type symbol component, where the first resource element quantity indicates a quantity of resource elements corresponding to a same modulation symbol between different signal blocks in one slot. The network device determines the size of the transport block based on a second resource element quantity and the first resource element quantity, where the second resource element quantity is a quantity of resource elements used to transmit the third information in one slot.

According to the foregoing design, when the size of the transport block is re-determined, a resource reserved for inter-block replication is considered, so that a difference between an actual code rate and a configured code rate can be within a specific range, to ensure demodulation performance.

In a possible design, when the network device determines the size of the transport block based on the second resource element quantity and the first resource element quantity, the network device determines the size of the transport block based on a difference between the second resource element quantity and the first resource element quantity; or the network device determines the size of the transport block based on a difference between the second resource element quantity and a first quantized value, where the first quantized value is obtained after the first resource element quantity is quantized at a preset spacing.

According to the foregoing design, when the size of the transport block is calculated, the resource reserved for inter-block replication is considered, so that demodulation performance can be further ensured.

In a possible design, the length of the third-type symbol component is a first preset value, and the first information indicates a sum of the length of the second-type symbol component and a length of the cyclic prefix.

According to the foregoing design, the second information may be carried or indicated by reusing an existing field or adding a new field, so that lengths of a plurality of types of second-type symbol components can be indicated.

In a possible design, the first information further indicates a difference between the length of the first-type symbol component and the length of the third-type symbol component.

According to the foregoing design, the first-type symbol component can be configured by indicating the difference between the length of the first-type symbol component and the length of the third-type symbol component or a difference between a length index of the first-type symbol component and a length index of the third-type symbol component, and the method is simple.

In a possible design, a unit of the length of the first-type symbol component is a quantity of sampling points obtained after IFFT, or an absolute time unit, or a quantity of sampling points obtained after IFFT is performed by using FFT points of a specified quantity; a unit of the length of the second-type symbol component is a quantity of sampling points obtained after IFFT, or an absolute time unit, or a quantity of sampling points obtained after IFFT is performed by using FFT points of a specified quantity; and a unit of the length of the third-type symbol component is a quantity of sampling points obtained after IFFT, or an absolute time unit, or a quantity of sampling points obtained after IFFT is performed by using FFT points of a specified quantity.

According to a third aspect, this application provides a communication apparatus. The apparatus is a terminal device or a module configured to implement a function of a terminal device, and the apparatus includes a transceiver module and a processing module.

The transceiver module is configured to obtain first information and second information, where the first information is used to determine a length of a first-type symbol component, the second information is used to determine at least one of a length of a second-type symbol component and a length of a third-type symbol component, and the length of the first-type symbol component is greater than the length of the third-type symbol component. The processing module is configured to: determine a plurality of signal blocks based on the first information and the second information, where each signal block includes a plurality of modulation symbols; and process each of the plurality of signal blocks to obtain an orthogonal frequency division multiplexing OFDM symbol corresponding to the signal block. The transceiver module is configured to send the OFDM symbol. A first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k≥2$, and k is an integer.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1. A second-type symbol component in a $(k−1)^{th}$ signal block is last Y modulation symbols in the $(k−1)^{th}$ signal block, and in the $k^{th}$ signal block, there are m modulation symbols between an end modulation symbol of modulation symbols that are the same as the modulation symbols in the second-type symbol component in the $(k−1)^{th}$ signal block and a last modulation symbol of the $k^{th}$ signal block, where Y≥1. The third-type symbol component in the $k^{th}$ signal block is first Z modulation symbols in the $k^{th}$ signal block, Z<X, Z≥1, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, the length of the third-type symbol component is a first preset value, and the second information indicates a sum of the length of the second-type symbol component and a length of the cyclic prefix.

In a possible design, the first information indicates a difference between the length of the first-type symbol component and the length of the third-type symbol component.

In a possible design, the processing module is configured to: when determining the plurality of signal blocks based on the first information and the second information, determine a size of a transport block based on the first information and the second information; and determine, based on the size of the transport block, a plurality of signal blocks corresponding to third information, where the third information is information that needs to be sent by the terminal device to the network device.

In a possible design, the processing module is configured to: when determining the size of the transport block based on the first information and the second information, determine, based on the length of the first-type symbol component, a quantity of modulation symbols included in the first-type symbol component; determine, based on the length of the second-type symbol component, a quantity of modulation symbols included in the second-type symbol component; determine, based on the length of the third-type symbol component, a quantity of modulation symbols included in the third-type symbol component; determine a first resource element quantity based on the quantity of modulation symbols included in the first-type symbol component, the quantity of modulation symbols included in the second-type symbol component, and the quantity of modulation symbols included in the third-type symbol component, where the first resource element quantity indicates a quantity of resource elements corresponding to a same modulation symbol between different signal blocks in one slot; and determine the size of the transport block based on a second resource element quantity and the first resource element quantity, where the second resource element quantity is a quantity of resource elements used to transmit the third information in one slot.

In a possible design, the processing module is configured to: when determining the size of the transport block based on the second resource element quantity and the first resource element quantity, determine the size of the transport block based on a difference between the second resource element quantity and the first resource element quantity; or determine the size of the transport block based on a difference between the second resource element quantity and a first quantized value, where the first quantized value is obtained after the first resource element quantity is quantized at a preset spacing.

In a possible design, a unit of the length of the first-type symbol component is a quantity of sampling points obtained after IFFT, or an absolute time unit, or a quantity of sampling points obtained after IFFT is performed by using FFT points of a specified quantity; a unit of the length of the second-type symbol component is a quantity of sampling points obtained after IFFT, or an absolute time unit, or a quantity of sampling points obtained after IFFT is performed by using FFT points of a specified quantity; and a unit of the length of the third-type symbol component is a quantity of sampling points obtained after IFFT, or an absolute time unit, or a quantity of sampling points obtained after IFFT is performed by using FFT points of a specified quantity.

According to a fourth aspect, this application provides a communication apparatus. The apparatus is a network device or an apparatus configured to implement a function of a network device, and the apparatus includes a transceiver module and a processing module.

The transceiver module is configured to send first information and second information to a terminal device, where the first information is used to determine a length of a first-type symbol component, the second information is used to determine at least one of a length of a second-type symbol component and a length of a third-type symbol component, and the length of the first-type symbol component is greater than the length of the third-type symbol component. The transceiver module is configured to receive a plurality of OFDM symbols from the terminal device, where the plurality of OFDM symbols are in a one-to-one correspondence with a plurality of signal blocks, each signal block includes a plurality of modulation symbols, a first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k \geq 2$, and k is an integer. The processing module is configured to: determine a receive window corresponding to each of the plurality of OFDM symbols; and obtain a demodulation signal of each OFDM symbol based on the receive window corresponding to each OFDM symbol.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1. A second-type symbol component in a $(k-1)^{th}$ signal block is last Y modulation symbols in the $(k-1)^{th}$ signal block, and in the $k^{th}$ signal block, there are m modulation symbols between an end modulation symbol of modulation symbols that are the same as the modulation symbols in the second-type symbol component in the $(k-1)^{th}$ signal block and a last modulation symbol of the $k^{th}$ signal block, where Y≥1. The third-type symbol component in the $k^{th}$ signal block is first Z modulation symbols in the $k^{th}$ signal block, Z<X, Z≥1, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, the processing module is configured to: when determining the receive window corresponding to each of the plurality of OFDM symbols, determine, based on the length of the first-type symbol component, a receive window corresponding to a first OFDM symbol in the plurality of OFDM symbols, where a start point of the receive window corresponding to the first OFDM symbol is associated with the length of the first-type symbol component; and determine, based on the duration of the cyclic prefix, a receive window corresponding to a $k^{th}$ symbol. A spacing between an end point of the receive window corresponding to the first OFDM symbol and a start point of a receive window corresponding to a second OFDM symbol is T1 sampling points, a spacing between an end point of the receive window corresponding to the $k^{th}$ OFDM symbol and a start point of a receive window corresponding to a $(k+1)^{th}$ OFDM symbol is T2 sampling points, T1<T2, and T1 and T2 are positive integers.

In a possible design, the processing module is configured to: when determining, based on the length of the first-type symbol component, the receive window corresponding to the first OFDM symbol in the plurality of OFDM symbols, determine at least one candidate receive window based on the length of the first-type symbol component; and determine, from the at least one candidate receive window based on a preset parameter, the receive window corresponding to the first OFDM symbol, where a spacing between any two adjacent start points in start points of the at least one candidate receive window is $\Delta T$ sampling points, and $\Delta T$ is a preset value and a positive integer.

In a possible design, the processing module is further configured to: determine, based on the demodulation signal of each OFDM symbol, a received signal of a signal block corresponding to each OFDM symbol; demap, based on the first information and the second information, the received signal of the signal block corresponding to the OFDM symbol; and obtain received bit information based on a demapping result.

In a possible design, the processing module may demap, based on the first information and the second information, the received signal of the signal block corresponding to each OFDM symbol in but not limited to the following manners.

Manner 1: The processing module performs demapping based on a received signal corresponding to the first-type symbol component and a received signal corresponding to the second-type symbol component in received signals of the first signal block, and the processing module performs demapping based on a received signal corresponding to the third-type symbol component and a received signal corresponding to the second-type symbol component in received signals of the $k^{th}$ signal block.

Manner 2: The processing module performs demapping, based on a received signal corresponding to the first-type symbol component in the first signal block and a received signal corresponding to the second-type symbol component in the first signal block in received signals of the second signal block, and the processing module performs demapping based on a received signal corresponding to the third-type symbol component in the $k^{th}$ signal block and a received signal corresponding to the second-type symbol component in the $k^{th}$ signal block in received signals of the $(k+1)^{th}$ signal block.

Manner 3: The processing module performs demapping based on an average value between a received signal corresponding to the first-type symbol component in received signals of the first signal block and a received signal corresponding to the first-type symbol component in the first signal block in received signals of the second signal block and an average value between a received signal corresponding to the second-type symbol component in the received signals of the first signal block and a received signal corresponding to the second-type symbol component in the first signal block in the received signals of the second signal block, and performs demapping based on an average value between a received signal corresponding to the third-type symbol component in received signals of the $k^{th}$ signal block and a received signal corresponding to the third-type symbol component in the $k^{th}$ signal block in received signals of the $(k+1)^{th}$ signal block and an average value between a received signal corresponding to the second-type symbol component in the received signals of the $k^{th}$ signal block and a received signal corresponding to the second-type symbol component in the $k^{th}$ signal block in the received signals of the $(k+1)^{th}$ signal block.

Manner 4: When the processing module determines that noise power of received signals of the $k^{th}$ signal block is lower than noise power of received signals of the $(k+1)^{th}$ signal block, the processing module performs demapping based on a received signal corresponding to the third-type symbol component and a received signal corresponding to the second-type symbol component in the received signals of the $k^{th}$ signal block; or when the processing module determines that noise power of received signals of the $k^{th}$ signal block is higher than noise power of received signals of the $(k+1)^{th}$ signal block, the processing module performs demapping based on a received signal corresponding to the third-type symbol component in the $k^{th}$ signal block and a received signal corresponding to the second-type symbol component in the $k^{th}$ signal block in the received signals of the $(k+1)^{th}$ signal block.

In a possible design, the processing module is further configured to: determine a size of a transport block based on the first information and second information; and decode the received bit information based on the size of the transport block, to obtain third information, where the third information is information that needs to be sent by the terminal device to the network device.

In a possible design, the processing module is configured to: when determining the size of the transport block based on the first information and the second information, determine, based on the length of the first-type symbol component, a quantity of modulation symbols included in the first-type symbol component; determine, based on the length of the second-type symbol component, a quantity of modulation symbols included in the second-type symbol component; determine, based on the length of the third-type symbol component, a quantity of modulation symbols included in the third-type symbol component; determine a first resource element quantity based on the quantity of modulation symbols included in the first-type symbol component, the quantity of modulation symbols included in the second-type symbol component, and the quantity of modulation symbols included in the third-type symbol component, where the first resource element quantity indicates a quantity of resource elements corresponding to a same modulation symbol between different signal blocks in one slot; and determine the size of the transport block based on a second resource element quantity and the first resource element quantity, where the second resource element quantity is a quantity of resource elements used to transmit the third information in one slot.

In a possible design, the processing module is configured to: when determining the size of the transport block based on the second resource element quantity and the first resource element quantity, determine the size of the transport block based on a difference between the second resource element quantity and the first resource element quantity; or determine the size of the transport block based on a difference between the second resource element quantity and a first quantized value, where the first quantized value is obtained after the first resource element quantity is quantized at a preset spacing.

In a possible design, the length of the third-type symbol component is a first preset value, and the first information indicates a sum of the length of the second-type symbol component and a length of the cyclic prefix.

In a possible design, the first information further indicates a difference between the length of the first-type symbol component and the length of the third-type symbol component.

In a possible design, a unit of the length of the first-type symbol component is a quantity of sampling points obtained after IFFT, or an absolute time unit, or a quantity of sampling points obtained after IFFT is performed by using FFT points of a specified quantity; a unit of the length of the second-type symbol component is a quantity of sampling points obtained after IFFT, or an absolute time unit, or a quantity of sampling points obtained after IFFT is performed by using FFT points of a specified quantity; and a unit of the length of the third-type symbol component is a quantity of sampling points obtained after IFFT, or an absolute time unit, or a quantity of sampling points obtained after IFFT is performed by using FFT points of a specified quantity.

For technical effect that can be achieved by any possible design of the third aspect and the fourth aspect, refer to descriptions of technical effect that can be achieved by corresponding possible designs of the first aspect and the second aspect. Details are not described repeatedly.

According to a fifth aspect, this application further provides an apparatus. The apparatus may perform the foregoing method design. The apparatus may be a chip or a circuit that can perform the functions corresponding to the foregoing method, or a device including the chip or the circuit.

In a possible implementation, the apparatus includes: a memory, configured to store computer-executable program code; and a processor, where the processor is coupled to the memory. The program code stored in the memory includes instructions. When the processor executes the instructions, the apparatus or a device on which the apparatus is installed is enabled to perform the method in any one of the foregoing possible designs.

The apparatus may further include a communication interface. The communication interface may be a transceiver. Alternatively, if the apparatus is a chip or a circuit, the communication interface may be an input/output interface of the chip, for example, an input/output pin.

In a possible design, the apparatus includes corresponding functional units, separately configured to implement the steps in the foregoing method. The function may be implemented by hardware, or may be implemented by executing corresponding software by hardware. The hardware or the software includes one or more units that correspond to the foregoing functions.

According to a sixth aspect, this application provides a computer-readable storage medium. The computer-readable storage medium stores a computer program, and when the computer program is run on an apparatus, the method in any one of the foregoing possible designs is performed.

According to a seventh aspect, this application provides a computer program product. The computer program product includes a computer program, and when the computer program is run on an apparatus, the method in any one of the foregoing possible designs is performed.

According to an eighth aspect, this application provides a communication system. The system includes a terminal device and a network device. The terminal device is configured to implement any possible design of the first aspect, and the network device is configured to implement any possible design of the second aspect.

DETAILED DESCRIPTION OF ILLUSTRATIVE EMBODIMENTS

The following clearly describes the technical solutions in embodiments of this application with reference to the accompanying drawings in embodiments of this application. It is clear that the described embodiments are merely some but not all of embodiments of this application. In the specification, claims, and accompanying drawings of this application, the terms "first", "second", corresponding term numbers, and the like are intended to distinguish between similar objects but do not necessarily indicate a specific order or sequence. It should be understood that the terms used in such a way are interchangeable in appropriate circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

In descriptions of this application, "/" means "or" unless otherwise specified. For example, A/B may indicate A or B. In this application, "and/or" describes only an association relationship for describing associated objects and indicates that three relationships may exist. For example, A and/or B may indicate the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be in a singular form or a plural form. In this application, unless otherwise specified, for identical or similar parts in embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in different embodiments and the implementations/implementation methods in embodiments may be combined to form a new embodiment, implementation, or implementation method based on an internal logical relationship thereof. The following implementations of this application are not intended to limit the protection scope of this application.

Figure 2A:
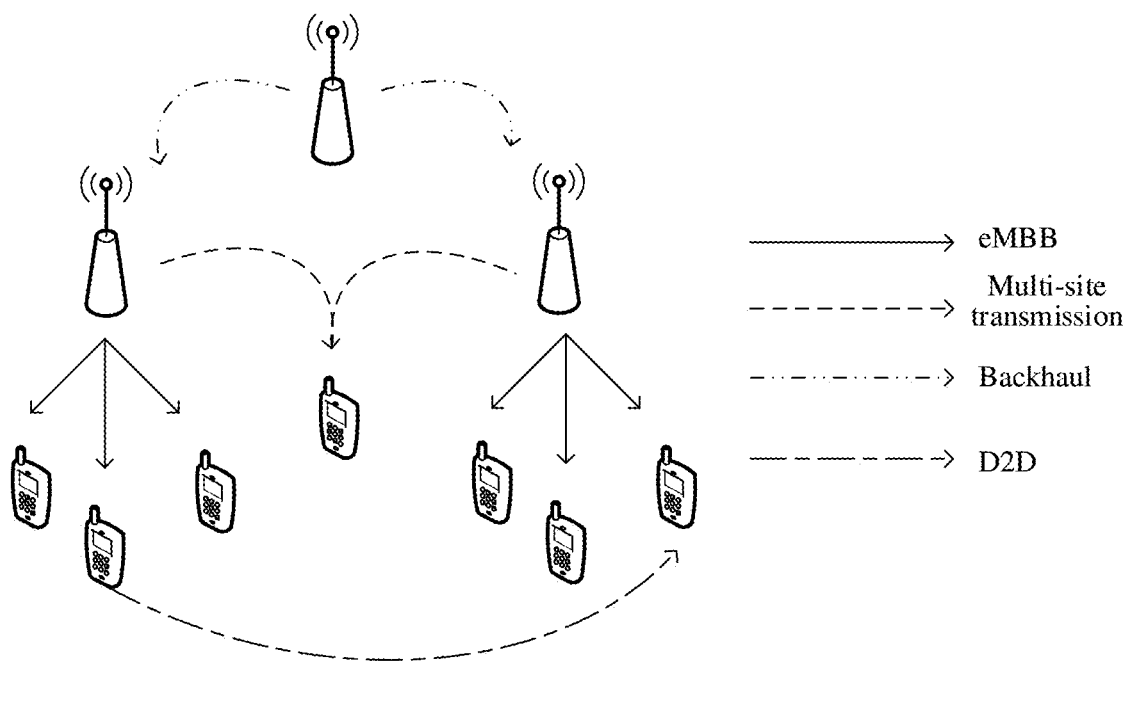
FIG. 2A is a schematic diagram of an architecture of a mobile communication system according to an embodiment of this application.

Refer to FIG. 2A. This application may be applied to but is not limited to the following scenarios: multi-site transmission (same user equipment (UE) communicates signals with a plurality of transmission points at the same time), backhaul, wireless to the x (WTTx), enhanced mobile broadband (eMBB), and device to device (D2D) scenarios.

Network elements in this application may include but are not limited to a terminal device and a network device.

The network device may be a device that can communicate with the terminal device. The network device may be a base station, a relay station, or an access point. The base station may be a base transceiver station (BTS) in a global system for mobile communications (GSM) or a code division multiple access (CDMA) network, or may be a NodeB (NB) in wideband code division multiple access (WCDMA), or may be an evolutional NodeB (eNB) in LTE. Alternatively, the network device may be a radio controller in a cloud radio access network (CRAN) scenario. Alternatively, the network device may be a base station device in a 5G network or a next generation network (for example, 6G), or a network device in a future evolved public land mobile network (PLMN). Alternatively, the network device may be a wearable device or a vehicle-mounted device.

The terminal device may be UE, an access terminal, a terminal unit, a terminal station, a mobile station, a remote station, a remote terminal, a mobile device, a wireless communication device, a terminal agent, a terminal apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network or a next generation network (for example, 6G), a terminal device in a future evolved PLMN network, or the like.

The technical solutions provided in embodiments of this application can be applied to various communication systems. For example, the solutions may be applied to a long term evolution (LTE) system or a 5G system, or may be applied to another future-oriented new system, for example, a 6G system or a programmable user plane system. This is not specifically limited in embodiments of this application. In addition, the term "system" and "network" may be substituted for each other.

Figure 2B:
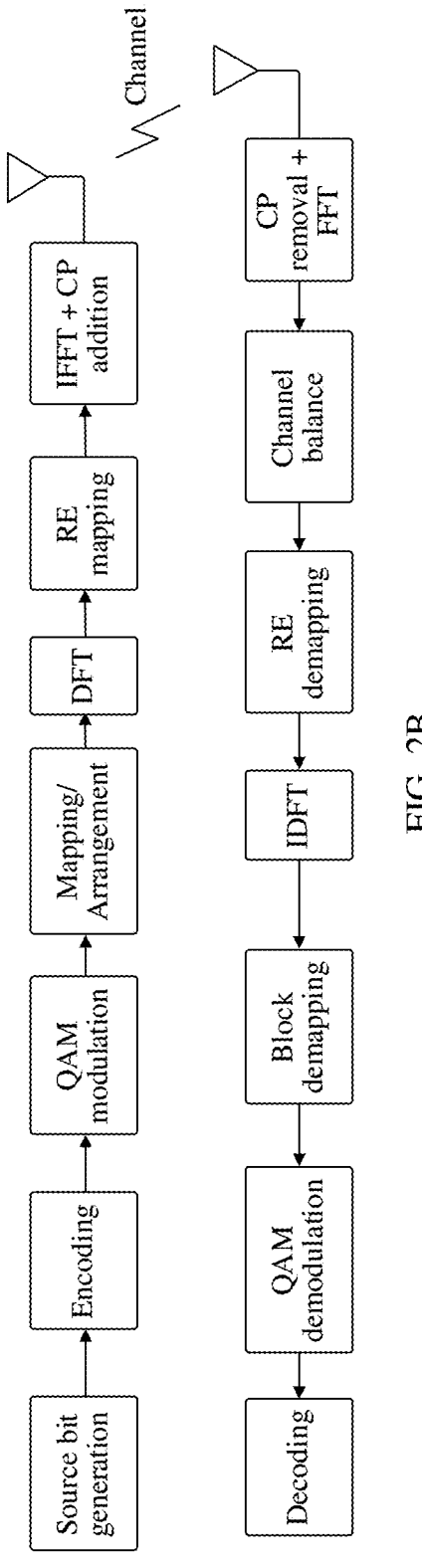
FIG. 2B is a schematic diagram of a baseband function module of a communication system according to an embodiment of this application.

A baseband function module of a communication system used in this application may be shown in FIG. 2B.

A transmit end mainly includes but is not limited to the following modules:

a source bit generating module, configured to generate an original source bit based on a size of a transport block, where the original source bit carries information that needs to be sent;

an encoding module, configured to add a redundancy code, a check code, or the like to the original source bit;

a quadrature amplitude modulation (QAM) module, configured to map an encoded bit into a modulation symbol based on a modulation order;

a mapping/arrangement module, configured to divide all modulation symbols in a slot into a plurality of signal blocks according to a mapping rule or an arrangement rule, where this process is alternatively referred to as serial-to-parallel conversion;

a discrete Fourier transform (Discrete Fourier Transform, DFT) module, configured to convert, in a unit of a signal block, the plurality of signal blocks into signals that can be mapped to frequency domain subcarriers;

a resource element (RE) mapping module, configured to map, to the frequency domain subcarriers, the signals that can be mapped to the subcarriers;

an inverse fast Fourier transform (IFFT) module, configured to convert, in a unit of an OFDM symbol, the signals mapped to the subcarriers into signals in a unit of a sampling point in time domain; and a CP addition module, configured to: copy, in a unit of an OFDM symbol, $X_1$ signals at a tail of an OFDM symbol 1, and add the $X_1$ signals to a head of the OFDM symbol 1; and then connect adjacent OFDM symbols head to tail, and sequentially send the adjacent OFDM symbols in a time sequence, where $X_1$ is a predefined or is determined based on a preconfigured CP length.

The receive end includes but is not limited to the following modules:

a CP removal and FFT module, configured to: remove a CP from a received signal based on a location of an FFT receive window, convert the received signal into a plurality of OFDM symbols in a serial-to-parallel manner, and convert the plurality of OFDM symbols into frequency domain, to obtain OFDM demodulation signals;

a channel equalization module, configured to: receive a signal based on a demodulation reference signal (DMRS) in frequency domain and complete channel estimation, and complete channel equalization of the received signal in frequency domain based on a channel estimation result;

an RE demapping module, configured to extract a signal from a specified subcarrier location, and arrange the signal in a unit of block;

an inverse discrete Fourier transform (IDFT) module, configured to convert a signal in the unit of block into a signal in a unit of a QAM modulation symbol in time domain, to obtain a received signal of a signal block, where the QAM modulation symbol is used as a unit means that each signal in the signal block is a QAM modulation signal, but due to impact of noise at the receive end, each signal in the received signal of the signal block is not a standard QAM modulation signal;

a block demapping module, configured to perform parallel-to-serial conversion on the received signal of the signal block;

a QAM demodulation module, configured to demodulate a modulation symbol obtained after parallel-to-serial conversion into receive bit information; and a decoding module, configured to complete decoding of the received bit information based on a check code, a redundancy code, and the like.

In addition, the transmit end may further include a digital-to-analog converter (digital-to-analog-converter, DAC), a power amplifier (PA), a frequency mixer, and the like. The receive end may further include an analog-to-digital converter (ADC), a low noise amplifier (LNA), a frequency mixer, and the like. It may be understood that the transmit end and the receive end each may further include another module. This is not limited in this application.

The following briefly describes technical concepts in embodiments of this application.

1. Discrete Fourier Transform-Spread-Orthogonal Frequency Division Multiplexing (Discrete Fourier Transform-Spread-OFDM, DFT-s-OFDM)

In a new radio (NR) system, uplink transmission supports a cyclic prefix orthogonal frequency division multiplexing (CP-OFDM) waveform and a DFT-s-OFDM waveform. DFT-s-OFDM is inherited from a long term evolution (LTE) system. DFT-s-OFDM is also referred to as a single-carrier waveform. Compared with CP-OFDM, DFT-s-OFDM has a low peak-to-average power ratio (PAPR). After data modulated through DFT-s-OFDM is arranged, DFT needs to be performed before the modulated data is mapped to a frequency domain subcarrier:

$$y(k) = \frac{1}{\sqrt{N}} \sum_{i=0}^{N-1} x(i) e^{-\frac{j2\pi ik}{N}}.$$

Herein, y(k) is a signal to be mapped to a subcarrier, N is a quantity of subcarriers in a scheduled bandwidth, x(i) is a modulation symbol, and a modulation method includes quadrature amplitude modulation (QAM), quadrature phase shift keying (QPSK) modulation, $\pi/2$ shifted binary phase shift keying ($\pi/2$ shifted binary phase shift keying, $\pi/2$-BPSK) modulation, amplitude phase shift keying (APSK) modulation, non-uniform QAM modulation, and the like.

Further, the transmit end maps the signal obtained after discrete Fourier transform to a subcarrier, and then performs IFFT and CP addition on the signal and sends the signal. After completing signal equalization in frequency domain, the receive end performs an IDFT operation on N received signals on subcarriers within the scheduled bandwidth on a same OFDM symbol, to obtain a received signal corresponding to the QAM modulation signal, and completes decoding based on the received signal to obtain information to be sent by the transmit end.

Because single-carrier waveforms such as DFT-s-OFDM waveforms has a low PAPR, the single-carrier waveforms are widely used in various communication systems (for example, the LTE system and the NR system). With same power amplification, a waveform with a lower PAPR can provide higher output power and higher power amplification efficiency, thereby improving coverage and reducing power consumption. In addition, coverage and power consumption advantages brought by the waveform with the low PAPR are particularly clear on a terminal device side. Further, in existing versions of the LTE system and the NR system, single-carrier waveforms are applied to uplink transmission.

Figure 3:
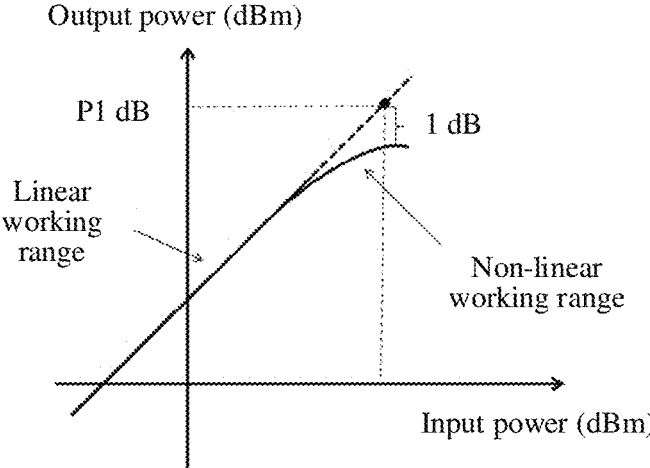
FIG. 3 is a schematic diagram of power consumption and a linearity indicator of a power amplifier according to an embodiment of this application.

In a higher frequency band (for example, a frequency band above 52.6 GHz supported by subsequent NR evolution), power consumption and a linearity indicator x of a power amplifier are poorer, or a linear working area is smaller. For example, as shown in FIG. 3, in a higher frequency band, a smaller linear working area indicates lower input power corresponding to P1 dB, where P1 dB refers to a working point at which a difference between a theoretical gain curve and an actual gain curve is 1 dB. Therefore, a low PAPR feature is particularly important, and the single-carrier waveforms such as DFT-s-OFDM waveforms may be more widely used. For example, in an NR standard of the frequency band above 52.6 GHz, a DFT-s-OFDM waveform or a single carrier-quadrature amplitude modulation (SC-QAM) waveform may be introduced in a downlink.

2. Multipath

The multipath refers to a propagation phenomenon in which radio signals are from a transmit antenna to a receive antenna through a plurality of paths.

3. High Frequency

The high frequency refers to a frequency band above 6 GHZ, and mainly includes 28 GHz, 39 GHz, 60 GHz, 73 GHZ, and the like. Due to rich spectrum resources, the high frequency becomes a research and development hotspot in the industry for resolving increasing communication requirements. Particularly, a spectrum segment of 52.6 GHz to 71 GHz has a significant feature of a large bandwidth. To fully utilize this segment of spectrum resources and improve a peak rate or a throughput, the industry proposes that a bandwidth occupied by a single carrier is increased from 400 MHz of current NR to about 2 GHz or higher. In addition, due to a limitation of hardware of a terminal device and an increasingly high requirement on a data demodulation delay, a maximum quantity of FFT points and a maximum quantity of resource blocks are limited. A larger quantity of FFT points indicates higher complexity of FFT implementation. For example, currently, a maximum supported quantity of FFT points is 4096, and a maximum supported quantity of resource blocks is 275. Under this limitation, bandwidths supported by subcarrier spacings 120 kHz, 240 kHz, 480 kHz, and 960 kHz are 400 MHZ, 800 MHz, 1600 MHZ, and 3200 MHz respectively. Therefore, to increase a bandwidth as much as possible when the quantity of FFT points is limited, research on large subcarrier spacings such as 960 kHz or even 1920 kHz is proposed.

4. CP

The CP is formed by replicating a signal at a tail of an OFDM symbol to a head. In an existing protocol, there are two types of CP lengths: a normal cyclic prefix (NCP) and an extended cyclic prefix (ECP). Duration of the NCP is less than duration of the ECP, and overheads of the NCP in one slot are also less than overheads of the ECP in one slot. Unless otherwise specified, a cyclic prefix is a normal cyclic prefix, and a normal cyclic prefix is represented by an NCP. Because the duration of the ECP is longer, a channel with a longer delay can be resisted, and overheads of the ECP are larger. Specifically, duration of the CP is related to a subcarrier spacing (SCS) in subcarrier mapping. A larger SCS indicates shorter CP duration and a shorter multipath delay that can be resisted.

Time lengths of an NCP and an ECP corresponding to each SCS are shown in the following Table 1.

TABLE 1

| Duration of NCPs and ECPs corresponding to different SCSs | | | | | |
|---|---|---|---|---|---|
| SCS | | | | | |
| 120 kHz | 240 kHz | 480 kHz | 960 kHz | 1920 kHz | 3840 kHz |
| NCP | ~586 ns | ~293 ns | ~146 ns | ~73 ns | ~37 ns | ~18 ns |
| ECP | ~2083 ns | ~1042 ns | ~521 ns | ~260 ns | ~130 ns | ~65 ns |

Herein, "~" indicates being approximately equal to, and being obtained through rounding off according to a formula. For example, round(x) indicates that x is rounded off.

A formula for calculating the NCP is round(144*1e9/(SCS*2048)), where a unit is nanosecond (ns), and a unit of the SCS is Hz. The NCP is a CP length that does not include a special symbol, and the special symbol is a first symbol in every 0.5 ms.

A formula for calculating the ECP is round(512*1e9/(SCS*2048)), where a unit is ns. Herein, $1e9=10^9$, "/" in the two formulas represents a division sign, and "*" represents a multiplication sign.

It can be learned from the table that, when the subcarrier spacing increases, the duration of the NCP becomes shorter. When the SCS increases to 960 kHz or even higher, CP duration corresponding to the SCS is short, and it is difficult to resist a channel with a long delay, thereby affecting data demodulation performance. Although the ECP can resist the channel with the long delay, because a network device that uses the ECP needs to apply the ECP to all terminal devices served by the network device, overheads introduced by some terminal devices that do not need the ECP are large due to the ECP configuration, throughputs of these terminal devices are reduced, and an overall data transmission rate of a network is affected.

For example, for the DFT-s-OFDM, a different guard interval is added between every two DFT-s-OFDM symbols to resist a multipath effect of a channel. The cyclic prefix is used as a guard interval between symbols. For different guard intervals, the DFT-s-OFDM may be classified into a normal cyclic prefix DFT-s-OFDM(CP-DFT-s-OFDM) (that is, a normal cyclic prefix is added to a symbol head), a zero tail-DFT-s-OFDM(ZT-DFT-s-OFDM) (a signal with approximately zero power is added to a symbol tail), a unique word-DFT-s-OFDM(UW-DFT-s-OFDM) (a signal generated based on a unique word is added to a symbol head), and the like.

Figure 4A:
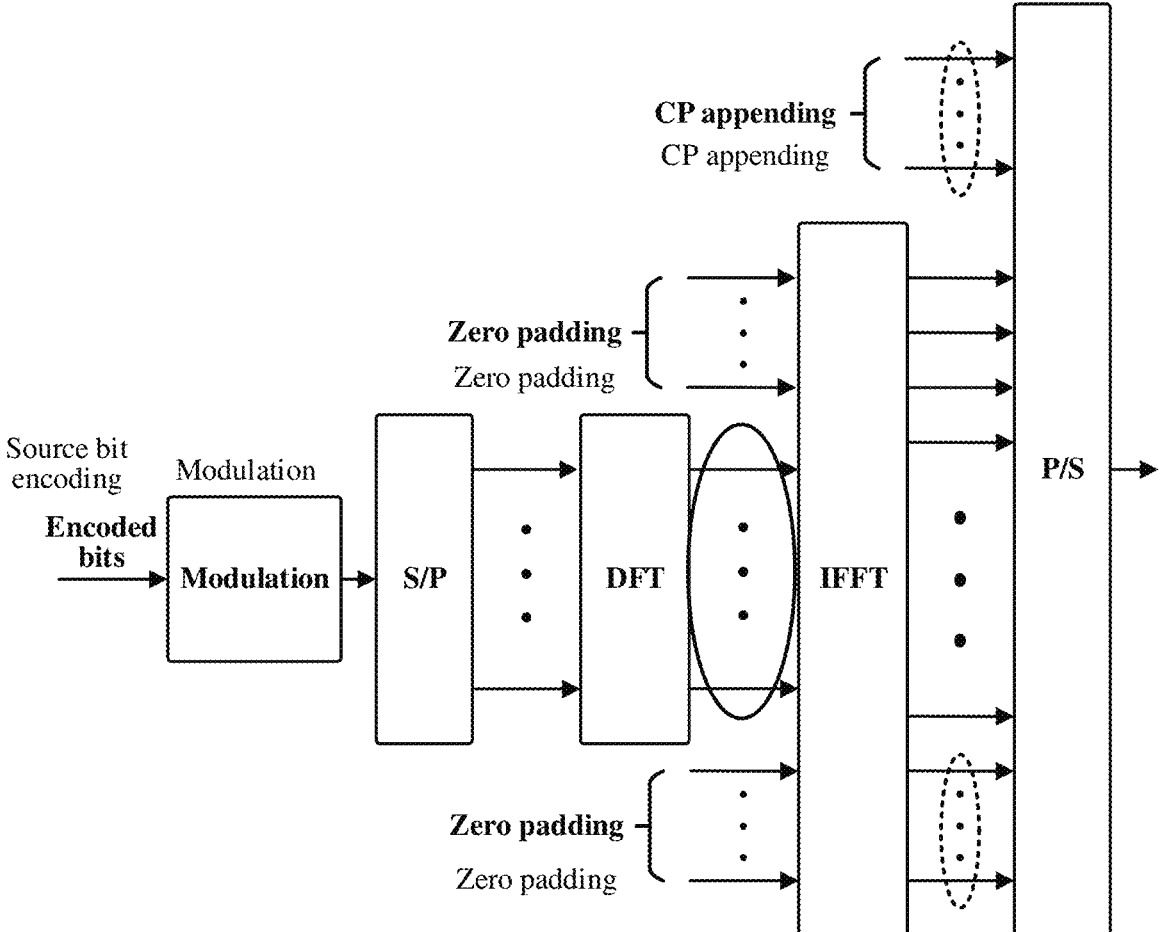
FIG. 4A is a schematic diagram of signal generation of CP-DFT-s-OFDM according to an embodiment of this application.

The CP-DFT-s-OFDM is used as an example, a schematic diagram of generating a CP-DFT-s-OFDM signal is shown in FIG. 4A. A CP-DFT-s-OFDM signal generation and transmission process is as follows: source bit encoding (corresponding to the source bit generating module and the encoding module in FIG. 2B), modulation (corresponding to the QAM modulation module in FIG. 2B), serial-to-parallel conversion (corresponding to the mapping/arrangement module in FIG. 2B), DFT (corresponding to the DFT module in FIG. 2B), subcarrier mapping (corresponding to the RE mapping module in FIG. 2B), IFFT, CP addition (a signal at a tail of a symbol is copied to a head, and in FIG. 4A, a symbol at a bottom is copied to a top), and performing sending through an antenna after parallel-to-serial conversion. A black circle may be understood as the subcarrier mapping.

Figures 4B, 5:
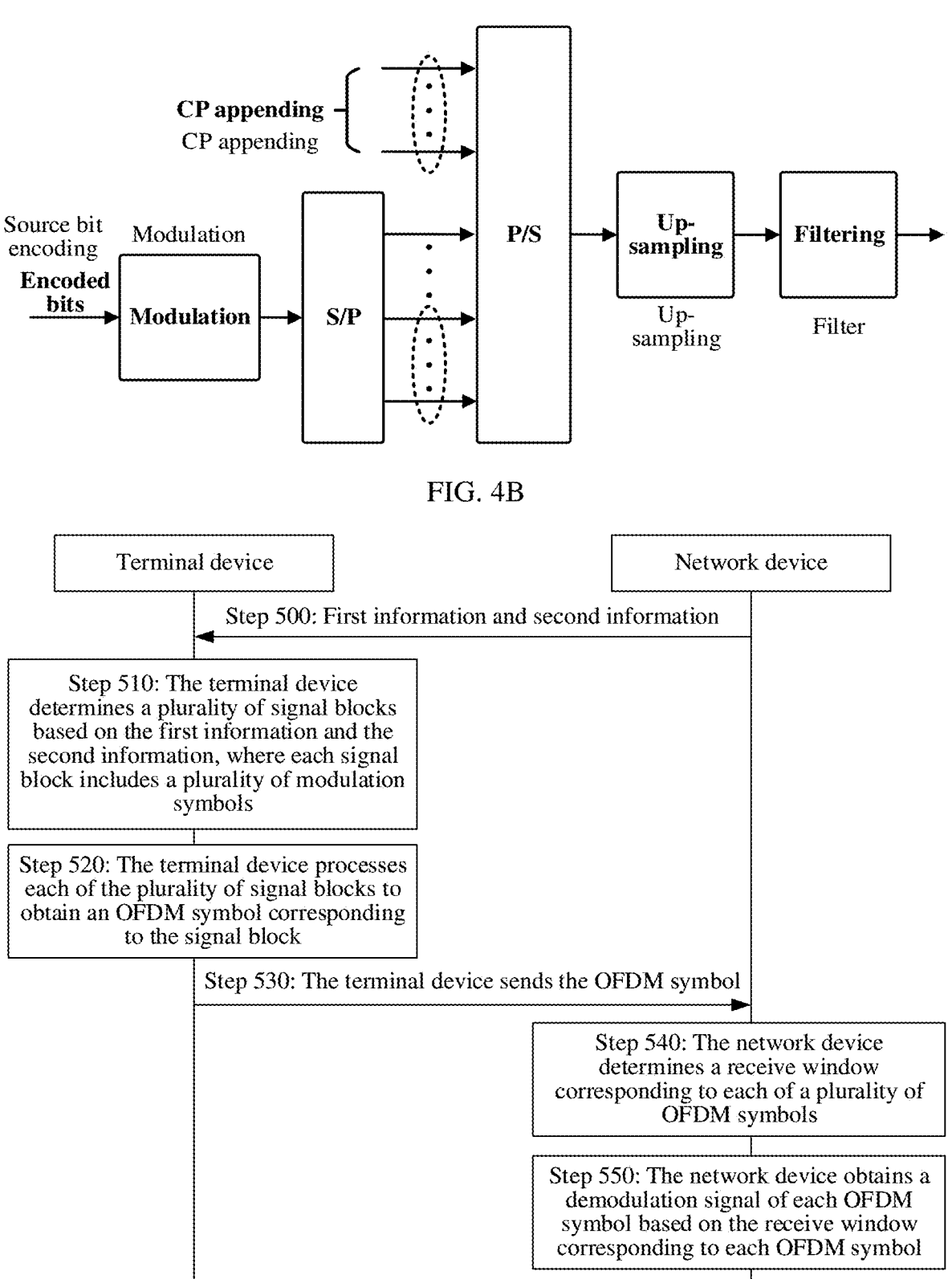
FIG. 4B is a schematic diagram of signal generation of SC-QAM according to an embodiment of this application.
FIG. 5 is an overview flowchart of a communication method according to an embodiment of this application.

In addition, cyclic prefix-SC-QAM (CP-SC-QAM) may also be used to generate a guard interval based on a CP, and a schematic diagram of generating a cyclic prefix-SC-QAM (CP-SC-QAM) signal is shown in FIG. 4B. Compared with that of the CP-DFT-s-OFDM, signal generation of the CP-SC-QAM does not have operations/modules for DFT, subcarrier mapping, and IFFT, but has operations/modules for up-sampling and filtering.

It should be noted that the symbol or the OFDM symbol in embodiments of this application may be a CP-DFT-s-OFDM symbol or another symbol. This is not limited in embodiments of this application. The following uses only the CP-DFT-s-OFDM symbol as an example for description. For ease of description, the CP-DFT-s-OFDM symbol is referred to as an OFDM symbol for short.

Figure 1:
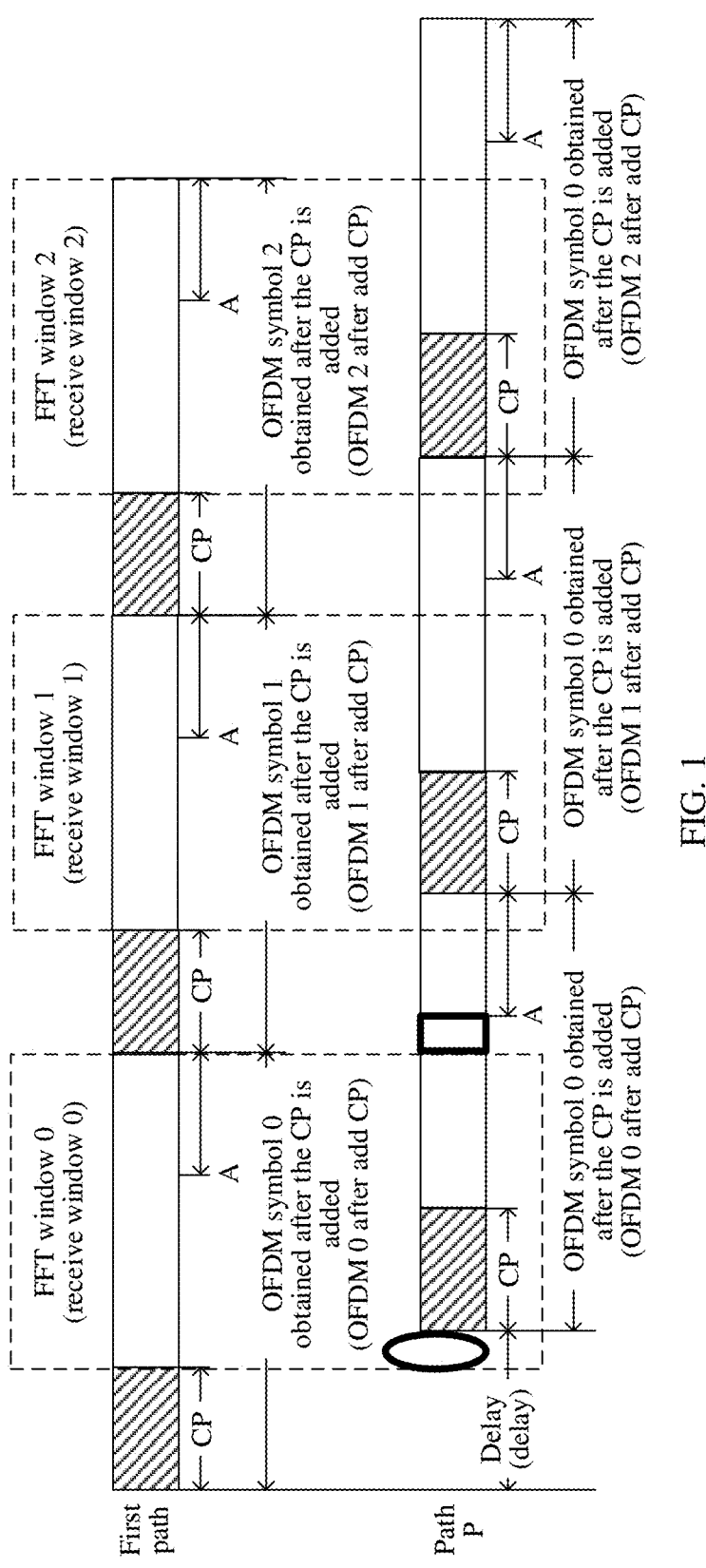
FIG. 1 is a schematic diagram of a first path and a path P according to this application.

As shown in FIG. 1, a length of an FFT receive window corresponding to each OFDM symbol is a length of one OFDM symbol, and a start location of the FFT receive window corresponding to each OFDM symbol is determined based on an end location of a CP. For example, a start location of an FFT receive window corresponding to a first OFDM symbol is an end location of a CP corresponding to the first OFDM symbol in a received signal corresponding to a first path. A start location of an FFT receive window corresponding to a second OFDM symbol is an end location of a CP corresponding to the second OFDM symbol in a received signal corresponding to a first path. A point A is a location at which a cyclic prefix is intercepted in each OFDM symbol. For example, signals between a point A in the first OFDM symbol and an end location of the first OFDM symbol are copied to a start location of the first OFDM symbol, and are used as the CP corresponding to the first OFDM symbol. For another example, signals between a point A in the second OFDM symbol and an end location of the second OFDM symbol are copied to a start location of the second OFDM symbol, and are used as the CP corresponding to the second OFDM symbol.

When a delay difference between a path P and the first path exceeds a CP length, received signals corresponding to the path P cannot completely fall into the FFT receive window determined in the foregoing manner. Specifically, for the first OFDM symbol, a part of signals (as shown by a thick line block in FIG. 1) that arrive at the receive end through the path P is lost. The part of the signals shown by the thick line block does not fall into the FFT receive window corresponding to the first OFDM symbol, and the part of the signals is located before the point A in the first OFDM symbol, that is, the part of the signals is not copied to be before the start location of the first OFDM symbol. Therefore, the part of the signals may be considered as a lost useful signal.

In addition, the FFT receive window corresponding to the first OFDM symbol further receives a signal (as shown by a thick line circle in FIG. 1) that arrives at the receive end through the path P in a previous slot, and causes interference to the first OFDM symbol. When there are enough lost signals and enough interference, performance of the first OFDM symbol may be affected. In particular, when the first OFDM symbol is an OFDM symbol in which DMRS is located, accuracy of channel estimation based on DMRS estimation is reduced, and therefore demodulation performance is reduced.

The path P may be any path in paths whose delays with the first path exceed the CP. Alternatively, the path P is a path whose delay with the first path exceeds the NCP and whose delay with the first path is the longest, or a path whose energy exceeds a first preset threshold and whose delay with the first path exceeds the NCP, or a path whose power exceeds a second preset threshold and whose delay with the first path exceeds the NCP.

Therefore, embodiments of this application provide a communication method, to reduce loss of a useful signal of a first OFDM symbol and reduce interference, so as to ensure performance of the first OFDM symbol. Specifically, as shown in FIG. 5, the method includes the following steps.

Step 500: A network device sends first information and second information to a terminal device.

The first information is used to determine a length of a first-type symbol component, the second information is used to determine at least one of a length of a second-type symbol component and a length of a third-type symbol component, and the length of the first-type symbol component is greater than the length of the third-type symbol component.

It may be understood that the first information and the second information may respectively correspond to different fields, and are carried in one message, for example, a radio resource control (RRC) message, or the first information and the second information may be carried in different messages, or the first information and/or the second information are/is preconfigured or predefined in a protocol, and do/does not need to be sent by the network device to the terminal device.

In addition, a unit of the length of the first-type symbol component is a quantity of sampling points obtained after IFFT, or an absolute time unit, or a quantity of sampling points obtained after IFFT is performed by using FFT points of a specified quantity. For example, if the specified quantity of FFT points is 2048, the quantity of sampling points obtained after IFFT is performed by using the FFT points of the specified quantity is 288, and a length of the sampling points is twice the length of the NCP. Similarly, a unit of the length of the second-type symbol component is a quantity of sampling points obtained after IFFT, or an absolute time unit, or a quantity of sampling points obtained after IFFT is performed by using FFT points of a specified quantity. A unit of the length of the third-type symbol component is a quantity of sampling points obtained after IFFT, or an absolute time unit, or a quantity of sampling points obtained after IFFT is performed by using FFT points of a specified quantity.

It may be understood that, the quantity of sampling points obtained after IFFT, the absolute time unit, and the quantity of sampling points obtained after IFFT is performed by using the FFT points of the specified quantity may be mutually converted. In addition, generally, a unit of the length of the NCP (or ECP) is ns, namely, the absolute time unit. Therefore, the unit of the length of the NCP (or ECP) may be converted into the quantity of sampling points obtained through IFFT or the quantity of sampling points obtained after IFFT is performed by using the FFT points of the specified quantity. In other words, the unit of the length of the NCP (or ECP) and the unit of the length of the first-type symbol component (or the unit of the length of the second-type symbol component or the unit of the length of the third-type symbol component) may be unified through unit conversion.

The following describes specific implementations of the first information and the second information.

1. First Information

In an implementation, the length of the first-type symbol component may be configured separately or configured in a difference manner. The difference may also be understood as a differential value.

In an example, the length of the first-type symbol component is separately configured. Specifically, the first information may indicate the length of the first-type symbol component or a length index of the first-type symbol component.

For example, the first information may be carried in a configuration of a bandwidth part (BWP). Specifically, a new field may be added to the configuration of the bandwidth part, and the new field is used to carry the first information and indicates the length of the first-type symbol component. For example, the new field may be named SCPfortheFirstSym, or certainly, may be named another name. The first-type symbol component is not limited in this application.

In another example, the length of the first-type symbol component is configured in the difference manner. Specifically, the first information may indicate a difference between the length of the first-type symbol component and the length of the third-type symbol component or a difference between the length index of the first-type symbol component and a length index of the third-type symbol component, or the first information may indicate a difference between the length of the first-type symbol component and the length of the second-type symbol component or a difference between the length index of the first-type symbol component and a length index of the second-type symbol component.

For example, lengths of a plurality of first-type symbol components and lengths of a plurality of third-type symbol components are preconfigured, where a length of each first-type symbol component corresponds to one index, and a length of each third-type symbol component corresponds to one index. The first information may indicate the difference between the length index of the first-type symbol component and the length index of the third-type symbol component, and the second information may indicate the length index of the third-type symbol component. The terminal device may determine the length index of the first-type symbol component based on the first information and the second information, to determine the length of the first-type symbol component.

For another example, lengths of a plurality of first-type symbol components and lengths of a plurality of second-type symbol components are preconfigured, where a length of each first-type symbol component corresponds to one index, and a length of each second-type symbol component corresponds to one index. The first information may indicate the difference between the length index of the first-type symbol component and the length index of the second-type symbol component, and the second information may indicate the length index of the second-type symbol component. The terminal device may determine the length index of the first-type symbol component based on the first information and the second information, to determine the length of the first-type symbol component.

It should be noted that the preconfigured length of the symbol component and the corresponding index may be directly stored in the network device and the terminal device, and do not need to be notified by using signaling. Optionally, the preconfigured length of the symbol component and the corresponding index may alternatively be notified to the terminal device by network device by using signaling. This is not limited in this application.

It may be understood that, in the implementation in which the length of the first-type symbol component is configured in the difference manner, the foregoing two examples are merely described in a length-index difference manner. Alternatively, the length index may be directly replaced with the length, and used as another implementation. For brevity, details are not described again.

2. Second Information

In a first implementation, the second information is used to determine the length of the second-type symbol component. The length of the third-type symbol component may be preconfigured or predefined in a protocol.

For example, at a specified SCS, the length of the third-type symbol component is a first preset value, and the first preset value may be preconfigured or predefined in a protocol. The second information indicates a sum of the length of the second-type symbol component and the length of the NCP. The sum of the length of the second-type symbol component and the length of the NCP may be between the length of the NCP and the length of the ECP, or the sum of the length of the second-type symbol component and the length of the NCP may be greater than or equal to the length of the ECP (for example, twice the length of the ECP). In addition, the sum of the length of the second-type symbol component and the length of the NCP may alternatively be referred to as a length of an equivalent CP. It may be understood that the sum of the length of the second-type symbol component and the length of the NCP is obtained through calculation after a unit of the length of the NCP and a unit of the length of the second-type symbol component are converted into a same unit.

The terminal device may determine the length of the second-type symbol component based on the length of the NCP and the sum of the length of the second-type symbol component and the length of the NCP.

The following uses only Example 1 and Example 2 as examples to describe the first implementation of the second information.

Example 1

The length of the third-type symbol component is the first preset value, and the second information is used to determine only the length of the second-type symbol component. For example, the second information may be carried in a configuration information element (for example, PUSCH-Config) of a physical uplink shared channel (PUSCH). Specifically, an existing field may be reused or a new field may be added to PUSCH-Config to carry or indicate the second information. In a possible implementation, the new field indicates the sum of the length of the second-type symbol component and the length of the NCP. For example, the new field may be represented by SCPHeadandTail, a value of SCPHeadandTail may be one of (0, 1, . . . , M), and M is a positive integer greater than or equal to 2. A value of M depends on a quantity of copies obtained by evenly dividing the length difference between the NCP and the ECP, so that the sum of the length of the second-type symbol component and the length of the NCP may be between length of the NCP and the length of the ECP. Certainly, the new field may alternatively be named another name. This is not limited in this application.

Figure 6A:
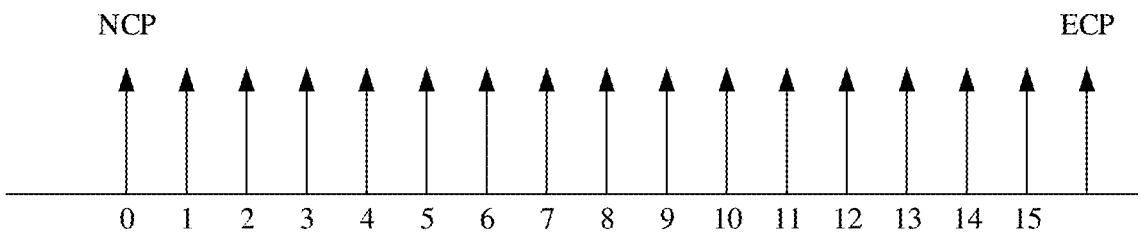
FIG. 6A is a schematic diagram A of division of a difference between lengths of an NCP and an ECP according to an embodiment of this application.

As shown in FIG. 6A, when M=15, the length difference between the NCP and the ECP is evenly divided into 16 parts. When the value of SCPHeadandTail is 0, SCP-HeadandTail indicates that the sum of the length of the second-type symbol component and the length of the NCP is the NCP. When the value of SCPHeadandTail is 15, SCPHeadandTail indicates that the sum of the length of the second-type symbol component and the length of the NCP is NCP+15/16*(ECP-NCP). When the value of SCP-HeadandTail is 7, SCPHeadandTail indicates that the sum of the length of the second-type symbol component and length of the NCP is NCP+7/16*(ECP-NCP).

Figure 6B:
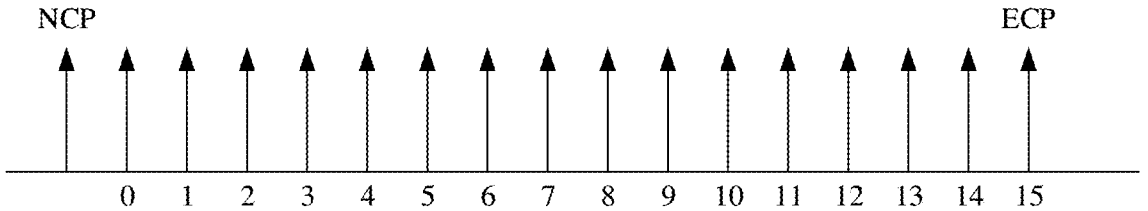
FIG. 6B is a schematic diagram B of division of a difference between lengths of an NCP and an ECP according to an embodiment of this application.

As shown in FIG. 6B, when M=15, the length difference between the NCP and the ECP is evenly divided into 16 parts. When the value of SCPHeadandTail is 0, SCP-HeadandTail indicates that the sum of the length of the second-type symbol component and the length of the NCP is NCP+1/16*(ECP-NCP). When the value of SCP-HeadandTail is 15, SCPHeadandTail indicates that the sum of the length of the second-type symbol component and the length of the NCP is the ECP. When the value of SCP-HeadandTail is 7, SCPHeadandTail indicates that the sum of the length of the second-type symbol component and the length of the NCP is NCP+8/16*(ECP-NCP).

Figure 6C:
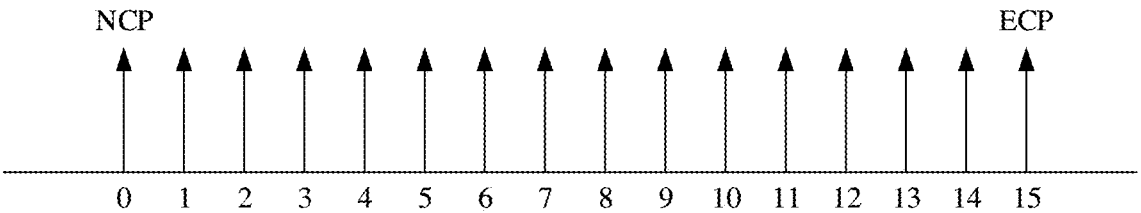
FIG. 6C is a schematic diagram C of division of a difference between lengths of an NCP and an ECP according to an embodiment of this application.

As shown in FIG. 6C, when M=15, the length difference between the NCP and the ECP is evenly divided into 15 parts. When the value of SCPHeadandTail is 0, SCP-HeadandTail indicates that the sum of the length of the second-type symbol component and the length of the NCP is the length of the NCP. When the value of SCPHeadandTail is 15, SCPHeadandTail indicates that the sum of the length of the second-type symbol component and the length of the NCP is the length of the ECP. When the value of SCP-HeadandTail is 7 SCPHeadandTail indicates that the sum of the length of the second-type symbol component and the length of the NCP is NCP+7/15*(ECP-NCP).

Figure 6D:
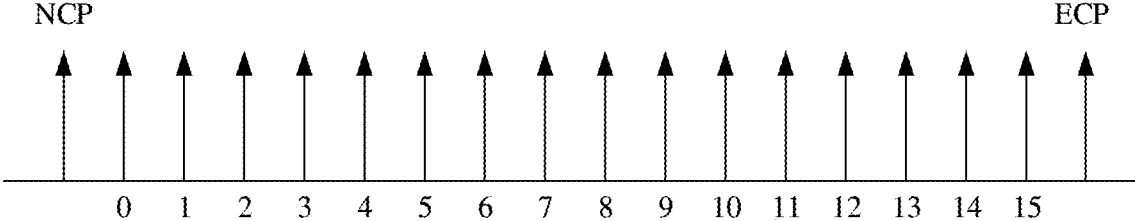
FIG. 6D is a schematic diagram D of division of a difference between lengths of an NCP and an ECP according to an embodiment of this application.

As shown in FIG. 6D, when M=15, the length difference between the NCP and the ECP is evenly divided into 17 parts. When the value of SCPHeadandTail is 0, SCP-HeadandTail indicates that the sum of the length of the second-type symbol component and the length of the NCP is NCP+1/17*(ECP-NCP). When the value of SCP-HeadandTail is 15, SCPHeadandTail indicates that the sum of the length of the second-type symbol component and the length of the NCP is NCP+(15+1)/17*(ECP-NCP). When the value of SCPHeadandTail is 7 SCPHeadandTail indicates that the sum of the length of the second-type symbol component and the length of the NCP is NCP+(7+1)/17* (ECP-NCP).

It should be noted that, as shown in FIG. 6A and FIG. 6C, when the value of SCPHeadandTail is 0, SCPHeadandTail indicates that the sum of the length of the second-type symbol component and the length of the NCP is the NCP. In this case, the length of the second-type symbol component is 0. Generally, the length of the second-type symbol component is not 0. Therefore, the value of SCPHeadandTail is generally not 0. In this case, 0 may be used as a default value. In addition, the value of M being 15 is merely an example, and there may be another value. In the foregoing examples, an example in which the length difference between the NCP and the ECP is evenly divided is used for description. In addition, a length difference between the NCP and twice the ECP may be evenly divided, or a length difference between the NCP and 0.8 times the ECP may be evenly divided. This is not limited in this application.

In addition, the value of SCPHeadandTail may alternatively be a plurality of values in (0, 1, . . . , M), and the network device may further indicate one of the plurality of values as a configuration used by the terminal device. For example, the network device may send a media access control control element (MAC CE) message or downlink control information (DCI) to the terminal device to indicate one of the plurality of values. For example, the network device sends an RRC message to the terminal device, where the RRC message includes a PUSCH-Config information element, the PUSCH-Config information element includes SCPHeadandTail, and the value of SCPHeadandTail is 3, 5, or 7. The network device may alternatively send DCI to the terminal device, where the DCI indicates that the value of SCPHeadandTail is 3. Further, the terminal device may determine the length of the second-type symbol component based on the value 3 of SCPHeadandTail.

For example, when the network device directly indicates the value of SCPHeadandTail to the terminal device by using the DCI, overheads of each piece of DCI are large. For example, when M=15, the DCI needs to use 4 bits to indicate the value of SCPHeadandTail. In addition, when a channel condition is unstable, the network device may need to frequently send DCI to indicate new SCPHeadandTail, and an overhead problem of the DCI is more definite. However, according to the foregoing method, the network device may first indicate a plurality of values of SCPHeadandTail, and then further indicate one of the plurality of values of SCPHeadandTail by using the DCI, to reduce DCI overheads. For example, the network device may indicate three values of SCPHeadandTail by using an RRC message or a MAC CE message, and then send DCI to the terminal device based on a current channel condition. The DCI indicates one of the three values of SCPHeadandTail. In this case, the DCI needs only 2 bits to indicate one of the three values of SCPHeadandTail. In addition, because the channel condition changes, when the network device needs to indicate a new value of SCPHeadandTail, the network device may send DCI to the terminal device, to update the value of SCP-HeadandTail. In this case, the DCI may still indicate one of the three values of SCPHeadandTail, and overheads of the DCI are still 2 bits. Therefore, the foregoing method can reduce DCI overheads.

According to the method provided in Example 1, an existing field is reused or a new field is added to the configuration information element of the PUSCH to carry or indicate the second information, so that the length of the second-type symbol component can be configured for each terminal device in a targeted manner. This method has high flexibility and is easy to implement.

Example 2

The length of the third-type symbol component is the first preset value, and the second information is used to determine only the length of the second-type symbol component. For example, the second information may be carried in a configuration of a bandwidth part (BWP). For example, a new option is added, and the new option is used to carry or indicate the second information. For example, the new option may be represented by a cyclicPrefix option, and the cyclicPrefix option may indicate one of {extended, SCP 1, SCP 2, . . . , SCP K}, where extended represents the ECP, the SCP 1 to the SCP K are added configurations, K is a positive integer, and meanings of the SCP 1 to the SCP K may be predefined in a protocol. For example, the SCP 1 to the SCP K are sums of lengths of K types of second-type symbol components and the length of the NCP. In other words, the second information may be indicated by cyclicPrefix. Specifically, the second information indicates the sum of the length of the second-type symbol component and the length of the NCP.

Optionally, the cyclicPrefix option may alternatively indicate a plurality of options in {extended, SCP 1, SCP 2, . . . , SCP K}, and the network device may further indicate one of the plurality of cyclicPrefix options as a configuration used by the terminal device. For example, the network device may send a MAC CE or DCI to the terminal device to indicate a specific cyclicPrefix option. For example, the network device sends an RRC message to the terminal device, where the RRC message includes the configuration of the BWP, the configuration of the BWP includes the cyclicPrefix option (namely, the second information), and the cyclicPrefix option indicates the SCP 1 and the SCP 2. Further, the network device may send DCI to the terminal device, where the DCI indicates a specific cyclicPrefix option, for example, the SCP 1. Further, the terminal device may determine the length of the second-type symbol component based on the SCP 1. For a specific effect, refer to the foregoing related descriptions about the plurality of values of SCPHeadandTail indicated by the network device. Details are not described again.

According to the method provided in Example 2, compared with the existing method in which the CP can be selected only from the NCP and the ECP, Example 2 provides more CP length selections, for example, the SCP 1, the SCP 2, . . . , the SCP K, and is compatible with an existing system.

In a second implementation, the second information is used to determine the length of the second-type symbol component and the length of the third-type symbol component.

The following further describes the second implementation of the second information with reference to Manner 1 to Manner 4.

Manner 1: The second information may separately indicate the length of the second-type symbol component and the length of the third-type symbol component. For example, the second information may be carried in a configuration information element (for example, PUSCH-Config) of a PUSCH. Specifically, fields SCPHeadPart and SCPTailPart may be added to PUSCH-Config, to carry or indicate the second information. For example, SCPHeadPart and SCP-TailPart respectively indicate the length of the third-type symbol component or the length index of the third-type symbol component and the length of the second-type symbol component or the length index of the second-type symbol component. In other words, SCPHeadPart and SCPTailPart are used as the second information to indicate the length of the third-type symbol component or the length index of the third-type symbol component and the length of the second-type symbol component or the length index of the second-type symbol component.

Manner 2: A plurality of combinations are preconfigured, where each combination includes a length of one second-type symbol component and a length of one third-type symbol component, each combination corresponds to one index, the index corresponds to the length of the one second-type symbol component and the length of the one third-type symbol component, and the second information indicates the length of the one group of second-type symbol components and the length of the one third-type symbol component by using the index indicating the combination.

In addition, a plurality of combinations may alternatively be preconfigured, where each combination includes a length of one first-type symbol component, a length of one second-type symbol component, and a length of one third-type symbol component, and each combination corresponds to one index, and the index corresponds to the length of the one first-type symbol component, the length of the one second-type symbol component, and the length of the one third-type symbol component. In this case, the first information and the second information may be used as one piece of information, and the information indicates, by using the index indicating the combination, an index corresponding to a group that including the length of the first-type symbol component, the length of the second-type symbol component, and the length of the third-type symbol component.

A correspondence between an index of a combination and a length of a symbol component length may be configured for the terminal device in advance, for example, reflected in a form of a mapping relationship table. When receiving an index of a combination, the terminal device may directly obtain a length of a corresponding symbol component by searching the table, to further reduce signaling overheads.

Manner 3: The second information may indicate the length of the third-type symbol component and the sum of the length of the second-type symbol component and the length of the NCP.

Figure 6E:
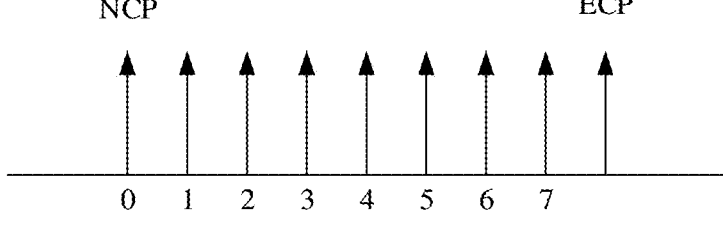
FIG. 6E is a schematic diagram E of division of a difference between lengths of an NCP and an ECP according to an embodiment of this application.

For example, the second information may be carried in a configuration information element (for example, PUSCH-Config) of a PUSCH. For example, a new field is added to PUSCH-Config, and the new field may carry or indicate the second information. Specifically, the new field indicates the length of the third-type symbol component and the sum of the length of the second-type symbol component and the length of the NCP. For example, the new field may be represented by SCPHeadandTail, a value of SCP-HeadandTail may be one of (0, 1, . . . , M), and M is a positive integer greater than or equal to 2. A value of M depends on a quantity of copies obtained by evenly dividing the difference between the NCP and the ECP, so that the sum of the length of the second-type symbol component and length of the NCP may be between the NCP and the ECP. As shown in FIG. 6E, when M=15, the difference between the NCP and the ECP is evenly divided into eight parts, where a value of SCPHeadandTail ranges from 0 to 7, indicating that the length of the third-type symbol component is H1, or a value of SCPHeadandTail ranges from 8 to 15, indicating that the length of the third-type symbol component is H2, and H1 and H2 are preconfigured or predefined in a protocol. When the value of SCPHeadandTail ranges from 0 to 7, for a specific method for determining the sum of the length of the second-type symbol component and the length of the NCP based on the value of SCPHeadandTail, refer to the related content in Example 1, and repeated content is not described again. When the value of SCPHeadandTail ranges from 8 to 15, the value of SCPHeadandTail first needs to be converted into a value ranging from 0 to 7. Specifically, when the value of SCPHeadandTail ranges from 8 to 15, a difference between the value of SCPHeadandTail and 8 may be obtained first, and the sum of the length of the second-type symbol component and the length of the NCP is determined based on the difference.

For example, when the value of SCPHeadandTail is 12, SCPHeadandTail indicates that the length of the third-type symbol component is H2, and SCPHeadandTail indicates that the sum of the length of the second-type symbol component and the length of the NCP is NCP+(12-8)/8 (ECP-NCP). When the value of SCPHeadandTail is 4, SCPHeadandTail indicates that the length of the third-type symbol component is H1, and SCPHeadandTail indicates that the sum of the length of the second-type symbol component and the length of the NCP is NCP+4/8(ECP-NCP). It can be learned that the sum that is of the length of the second-type symbol component and the length of the NCP and that is obtained when the value of SCP-HeadandTail is 12 is the same as the sum that is of the length of the second-type symbol component and the length of the NCP and that is obtained when the value of SCP-HeadandTail is 4, or it is described as follows: The length of the second-type symbol component obtained when the value of SCPHeadandTail is 12 is the same as the length of the second-type symbol component obtained when the value of SCPHeadandTail is 4. Similarly, the sum that is of the length of the second-type symbol component and the length of the NCP and that is obtained when the value of SCP-HeadandTail is 8+W is the same as the sum that is of the length of the second-type symbol component and the length of the NCP and that is obtained when the value of SCP-HeadandTail is W, or it is described as follows: The length of the second-type symbol component obtained when the value of SCPHeadandTail is 8+W is the same as the length of the second-type symbol component obtained when the value of SCPHeadandTail is W, where $1 \leq W \leq 7$, and W is an integer.

As shown in Table 2, when the value of SCPHeadandTail ranges from 0 to 7, a value of Dh is H1, or when the value of SCPHeadandTail ranges from 8 to 15, a value of Dh is H2. Dh corresponds to the length of the third-type symbol component, and Dt corresponds to the length of the second-type symbol component. A row 3 in Table 2 is used as an example. When the value of SCPHeadandTail is 1, the value of Dh is H1. When the value of SCPHeadandTail is 9, the value of Dh is H2. A length of a second-type symbol component corresponding to Dt when the value of SCP-HeadandTail is 1 is the same as a length of a second-type symbol component corresponding to Dt when the value of SCPHeadandTail is 9. In addition, the length of the second-type symbol component of Dt may be calculated based on the value of SCPHeadandTail being 1. In other words, the length of the second-type symbol component of Dt is 1/8(ECP-NCP).

TABLE 2

| Dt | Dh | |
| --- | --- | --- |
| | H1 | H2 |
| 0 | 0 | 8 |
| 1 | 1 | 9 |
| 2 | 2 | 10 |
| 3 | 3 | 11 |
| 4 | 4 | 12 |
| 5 | 5 | 13 |
| 6 | 6 | 14 |
| 7 | 7 | 15 |

Manner 4: The second information may indicate the length of the second-type symbol component and a sum of the length of the second-type symbol component and the length of the third-type symbol component; or the second information may indicate the length of the third-type symbol component and a sum of the length of the second-type symbol component and the length of the third-type symbol component.

For example, as shown in Table 3, it is assumed that $0 \leq Dh+Dt \leq 7$, $Dh \leq Dt$, a value range of Dt is 0 to 7, and a value range of Dh is 0 to 3, where Dh corresponds to the length of the third-type symbol component, and Dt corresponds to the length of the second-type symbol component. Dh and Dt are indicated in a joint encoding manner, where a joint encoding value range is 0 to 19, and each joint encoding value corresponds to a unique group of Dh and Dt. For example, it can be learned from Table 3 that, when the joint encoding value is 3, the value of Dt is 1, the value of Dh is 1, and Dh+Dt=2. For another example, when the joint encoding value is 2, the value of Dt is 0, the value of Dh is 2, and Dh+Dt=2. It can be learned that a same sum of Dh and Dt may correspond to different joint encoding values. For example, when Dh+Dt=3, a joint encoding value may be 4 or 5; when Dh+Dt=4, a joint encoding value may be 6 or 7 or 8; when Dh+Dt=5, a joint encoding value may be 9 or 10 or 11; when Dh+Dt=6, a joint encoding value may be 12 or 13 or 14 or 15; or when Dh+Dt=7, a joint encoding value may be 16, 17, 18, or 19.

For another example, it is assumed that 0=Dh+Dt≤8, Dh≤Dt, a value range of Dt is 0 to 7, a value range of Dh is 0 to 3, and Dh and Dt are indicated in a joint encoding manner, as shown in Table 4. Alternatively, it is assumed that 0≤Dh+Dt≤8, Dh≤Dt, a value range of Dt is 0 to 8, a value range of Dh is 0 to 4, and Dh and Dt are indicated in a joint encoding manner, as shown in Table 5. It should be noted that the manner of jointly encoding Dh and Dt is not limited to the examples in Table 3 to Table 5, and there is another indication manner. For example, it is assumed that 0≤Dh+Dt≤$A_{max}$, Dh≤Dt, a value range of Dt is 0 to $B_{max}$, and a value range of Dh is 0 to $C_{max}$, which may be similar to the examples, where $B_{max}$≤$A_{max}$, and $C_{max}$≤floor($A_{max}$/2).

For example, the network device may configure, for the terminal device in advance, Table 3, Table 4, or Table 5, a correspondence between a value of Dt and a length of a second-type symbol component, and a correspondence between a value of Dh and a length of a third-type symbol component. The network device sends the second information to the terminal device, where the second information indicates a joint encoding value. The terminal device determines a value of Dt and a value of Dh based on the joint encoding value and Table 3, Table 4, or Table 5, determines the length of the second-type symbol component based on the correspondence between a value of Dt and a length of a second-type symbol component, and determines the length of the third-type symbol component based on a correspondence between a value of Dh and a length of a third-type symbol component.

It should be noted that Table 3, Table 4, or Table 5, the correspondence between a value of Dt and a length of a second-type symbol component, and the correspondence between a value of Dh and a length of a third-type symbol component may be directly stored in the network device and the terminal device, and do not need to be notified by using signaling. Optionally, Table 3, Table 4, or Table 5, the correspondence between a value of Dt and a length of a second-type symbol component, and the correspondence between a value of Dh and a length of a third-type symbol component may alternatively be notified to the terminal device by the network device by using signaling. This is not limited in this application.

TABLE 3

| Dt | Dh | | | |
|---|---|---|---|---|
| | 0 | 1 | 2 | 3 |
| 0 | 0 | — | — | — |
| 1 | 1 | 3 | — | — |
| 2 | 2 | 5 | 8 | — |
| 3 | 4 | 7 | 11 | 15 |
| 4 | 6 | 10 | 14 | 19 |
| 5 | 9 | 13 | 18 | |
| 6 | 12 | 17 | | — |
| 7 | 16 | — | — | — |

TABLE 4

| Dt | Dh | | | |
|---|---|---|---|---|
| | 0 | 1 | 2 | 3 |
| 0 | 0 | — | — | — |
| 1 | 1 | 3 | — | — |
| 2 | 2 | 5 | 8 | — |
| 3 | 4 | 7 | 11 | 15 |
| 4 | 6 | 10 | 14 | 19 |
| 5 | 9 | 13 | 18 | 21 |
| 6 | 12 | 17 | 20 | — |
| 7 | 16 | — | — | — |

TABLE 5

| Dt | Dh | | | | |
|---|---|---|---|---|---|
| | 0 | 1 | 2 | 3 | 4 |
| 0 | 0 | — | — | — | — |
| 1 | 1 | 3 | — | — | — |
| 2 | 2 | 5 | 8 | — | — |
| 3 | 4 | 7 | 11 | 15 | — |
| 4 | 6 | 10 | 14 | 19 | 24 |
| 5 | 9 | 13 | 18 | 23 | — |
| 6 | 12 | 17 | 22 | — | — |
| 7 | 16 | 21 | — | — | — |
| 8 | 20 | — | — | — | — |

It should be noted that the configuration manners of the length of the first-type symbol component, the length of the second-type symbol component, and the length of the third-type symbol component are merely examples, and there may be another configuration manner. This is not limited in this application.

Step 510: The terminal device determines a plurality of signal blocks based on the first information and the second information, where each signal block includes a plurality of modulation symbols.

The modulation symbol in this application may be any one of a BPSK modulation symbol, a π/2 BPSK modulation symbol, a quadrature phase shift keying (QPSK) modulation symbol, a 16 QAM modulation symbol, a 64 QAM modulation symbol, or a 256 QAM modulation symbol. This is not limited in this application.

With reference to the accompanying drawings, the following describes a specific process in which the terminal device determines the plurality of signal blocks based on the first information and the second information.

Specifically, the terminal device may determine a size of a transport block based on the first information and the second information.

It should be noted that, because some modulation symbols in a previous signal block need to be replicated for a next signal block, compared with that in a scenario in which inter-block replication does not exist (which may also be referred to as an NCP scenario), a quantity of valid resources on each OFDM symbol of a PUSCH except a first OFDM symbol is reduced, where uplink transmission is used as an example. Therefore, when a total amount of transmitted information (such as uplink data, measurement information, and feedback information) remains unchanged, information carried by each time-frequency resource in an inter-block replication scenario is greater than information carried by each time-frequency resource in the scenario in which inter-block replication does not exist. As a result, a code rate increases, that is, an actual code rate is greater than a configured code rate. The configured code rate is configured by the network device for the terminal device, for example, may be obtained through table lookup based on an MCS.

Therefore, to ensure that a difference between the actual code rate and the configured code rate falls within a specific range, both ends for receiving and sending information need to re-determine the size of the transport block, that is, re-determine the size of the transport block based on a quantity of valid resource units (where a resource reserved for inter-block replication is considered). It may be understood that the size of the transport block re-determined in the scenario in which inter-block replication exists is less than the size of the transport block determined in the scenario in which inter-block replication does not exist (for example, the NCP scenario).

For example, the terminal device may determine the size of the transport block in the following steps.

Step 1: The terminal device may determine, based on the first information and the second information, the length of the first-type symbol component, the length of the second-type symbol component, and/or the length of the third-type symbol component; determine, based on the length of the first-type symbol component, a quantity of modulation symbols included in the first-type symbol component; determine, based on the length of the second-type symbol component, a quantity of modulation symbols included in the second-type symbol component; and determine, based on the length of the third-type symbol component, a quantity of modulation symbols included in the third-type symbol component.

Specifically, for example, a unit of a length of a symbol component is absolute time. The terminal device may determine absolute time $Q1$ of the first-type symbol component, absolute time $Q2$ of the second-type symbol component, and absolute time $Q3$ of the third-type symbol component based on the first information and the second information. In this case, the quantity of modulation symbols included in the first-type symbol component meets $QAM1=\mathrm{ceil}(Q1*SCS*N_{RB}*N_{RE/RB})$, the quantity of modulation symbols included in the second-type symbol component meets $QAM2=\mathrm{ceil}(Q2*SCS*N_{RB}*N_{RE/RB})$, and the quantity of modulation symbols included in the third-type symbol component meets $QAM3=\mathrm{ceil}(Q3*SCS*N_{RB}*N_{RE/RB})$.

For example, a unit of a length of a symbol component is a quantity of sampling points obtained after IFFT. The terminal device may determine, based on the first information and the second information, a quantity $M1$ of sampling points obtained after IFFT of the first-type symbol component, a quantity $M2$ of sampling points obtained after IFFT of the second-type symbol component, and a quantity $M3$ of sampling points obtained after IFFT of the third-type symbol component. In this case, the quantity of modulation symbols included in the first-type symbol component meets $QAM1=\mathrm{ceil}(M1/N_{fft}*N_{RB}*N_{RE/RB})$, the quantity of modulation symbols included in the second-type symbol component meets $QAM2=\mathrm{ceil}(M2/N_{fft}*N_{RB}*N_{RE/RB})$, and the quantity of modulation symbols included in the third-type symbol component meets $QAM3=\mathrm{ceil}(M3/N_{fft}*N_{RB}*N_{RE/RB})$.

For example, a unit of a length of a symbol component is a sampling point obtained after IFFT is performed by using FFT points of a specified quantity. The terminal device may determine, based on the first information and the second information, a quantity $S1$ of sampling points obtained after IFFT is performed by using FFT points of a specified quantity for the first-type symbol component, a quantity $S2$ of sampling points obtained after IFFT is performed by using FFT points of a specified quantity for the second-type symbol component, and a quantity $S3$ of sampling points obtained after IFFT is performed by using FFT points of a specified quantity for the third-type symbol component. In this case, the quantity of modulation symbols included in the first-type symbol component meets $QAM1=\mathrm{ceil}(S1/N_{fft-r}*N_{RB}*N_{RE/RB})$, the quantity of modulation symbols included in the second-type symbol component meets $QAM2=\mathrm{ceil}(S2*/N_{fft-r}*N_{RB}*N_{RE/RB})$, and the quantity of modulation symbols included in the third-type symbol component meets $QAM3=\mathrm{ceil}(S3/N_{fft-r}*N_{RB}*N_{RE/RB})$.

Herein, $\mathrm{ceil}(x)$ indicates rounding up x. In addition, rounding up may alternatively be replaced with rounding down or rounding off. $Q1$, $Q2$, and $Q3$ are in a unit of a second (s). $N_{RB}$ is a quantity of resource blocks (RB) included in a scheduled bandwidth allocated to the terminal device. $N_{RE/RB}$ is a quantity of REs included in each RB in frequency domain, and a general value is 12. The SCS is a subcarrier spacing, and a unit is Hz. $N_{fft}$ indicates an actual quantity of FFT points in a current BWP. For example, when the BWP bandwidth is 1600 MHz and the SCS is 480 kHz, $N_{fft}$ is 4096. $N_{fft-r}$ is a quantity of specified or reference FFT points, for example, 2048, 4096, 512, or 256.

Step 2: The terminal device may determine a first resource element quantity $N1$ based on the quantity of modulation symbols included in the first-type symbol component, the quantity of modulation symbols included in the second-type symbol component, and the quantity of modulation symbols included in the third-type symbol component, where the first resource element quantity $N1$ indicates a total quantity of resource elements corresponding to a same modulation symbol between different signal blocks in one slot.

Step 3: The terminal device may determine the size of the transport block based on a second resource element quantity $N2$ and the first resource element quantity $N1$, where the second resource element quantity $N2$ is a quantity of resource elements used to transmit the third information in one slot.

The third information is information that needs to be sent by the terminal device to the network device. For example, the third information may be uplink data, measurement information, or feedback information, such as channel quality information (CQI), reference signal received power (RSRP), transmitted precoding matrix information (TPMI), and hybrid automatic repeat request-acknowledgment (HARQ-ACK) information.

For example, it is assumed that one slot includes one symbol used to transmit a DMRS, S symbols used to transmit uplink data or measurement information or feedback information (excluding the DMRS symbol), and E special symbols (for example, the special symbol is determined based on a signal block including the first-type symbol component, and in a current example, the special symbol is the first OFDM symbol, that is, $E=1$). In this case, a quantity of effective resources (namely, a first resource element quantity) reduced due to an inter-block repeated symbol component in the entire slot is:

$$N1 = QAM3*(S-E) + QAM1*E + QAM2*S$$

$N2$ is a quantity of resource elements corresponding to S symbols in one slot. For $N2$, refer to a definition in an existing protocol. For details, refer to content in section 5.1.2.3 in the protocol 38.214.

For example, when the terminal device determines the size of the transport block based on the second resource element quantity N2 and the first resource element quantity N1, the terminal device may use but not limited to the following manners.

Manner 1: The terminal device determines the size of transport block based on a difference between the second resource element quantity N2 and the first resource element quantity N1. In Manner 1, when the size of the transport block is calculated, a resource reserved for inter-block replication is considered, so that a difference between a code rate and the configured code rate can be ensured within a specific range, to ensure demodulation performance. The difference between the second resource element quantity N2 and the first resource element quantity N1 is a quantity of valid resource elements, or may be understood as a quantity of resource elements obtained after the resource reserved for inter-block replication is removed.

Manner 2: The terminal device determines the size of the transport block based on a difference between the second resource element quantity N2 and a first quantized value, where the first quantized value is obtained after the first resource element quantity N1 is quantized at a preset spacing. The difference between the second resource element quantity N2 and the first quantized value is a quantity of valid resource elements.

For example, the first quantized value is q(N1), where q(N1) indicates that N1 is quantized at the preset spacing, and q(N1) meets $0 \leq q(N1) \leq N1$. For example, q(N1) may be floor(N1/$\Delta$N)*$\Delta$N, floor( . . . ) indicates rounding down, and $\Delta$N is a preset quantization spacing. When N1=670 and the preset quantization spacing $\Delta$N is 45, a value of q(N1) is 630. When N1=635 and the preset spacing $\Delta$N is 45, a value of q(N1) is 630.

In Manner 2, when the size of the transport block is calculated, a resource reserved for inter-block replication may be considered, and a tolerance range is reserved for calculating N2 by both the receive end and the transmit end, to achieve a good compromise between code rate increase and transport block reduction. In addition, a specific error may be allowed when both the receive end and the transmit end calculate N2.

After the size of the transport block is determined, the following describes a process of generating a plurality of signal blocks with reference to FIG. 2B.

The source bit generating module is configured to generate an original source bit based on the size of the transport block by using the third information.

The encoding module is configured to add a redundancy code, a check code, or the like to the original source bit.

The QAM modulation module is configured to map an encoded bit into a modulation symbol based on a modulation order.

The mapping/arrangement module is configured to map or arrange the modulation symbol into a plurality of signal blocks, where this process is alternatively referred to as serial-to-parallel conversion.

Figure 7:
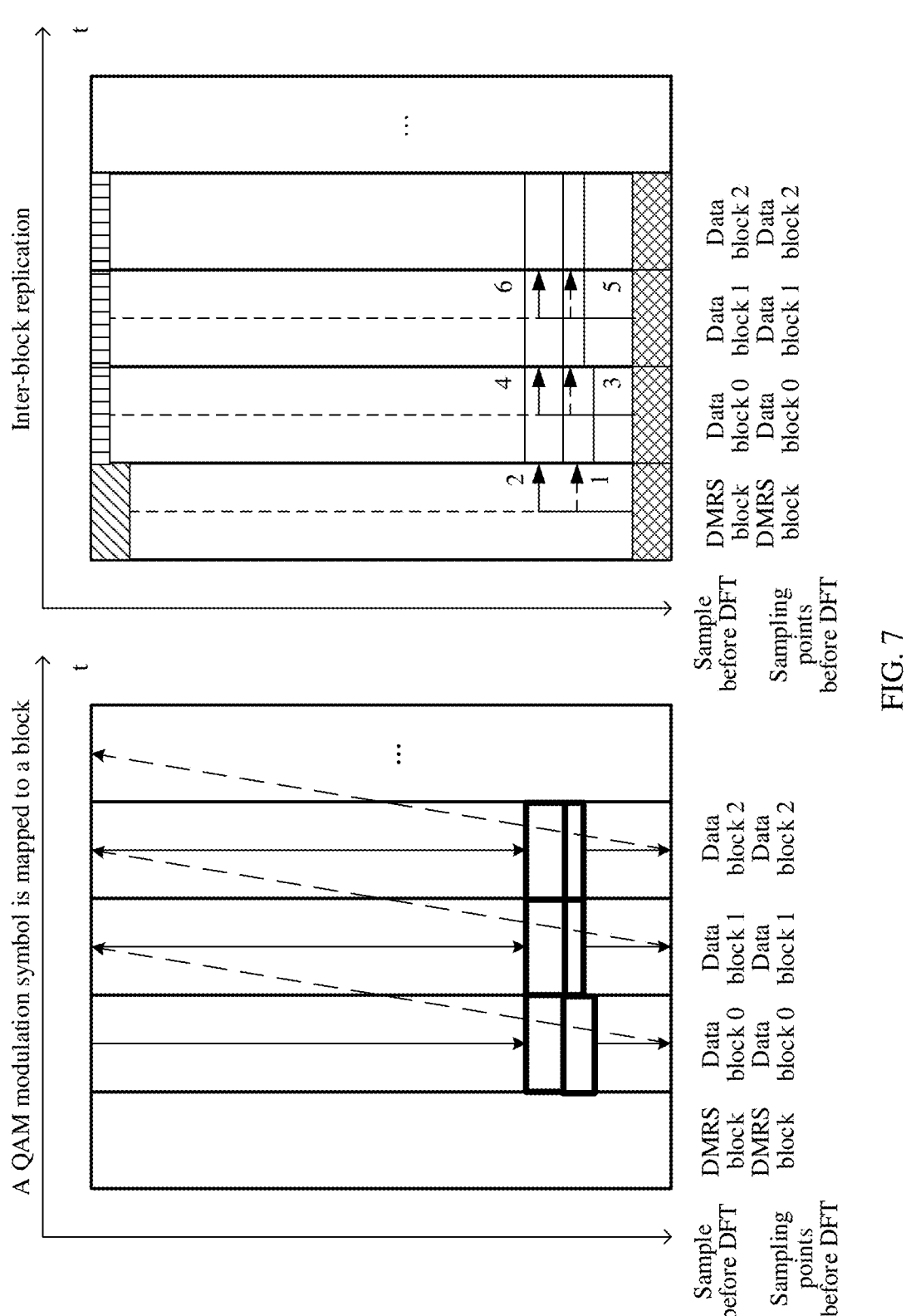
FIG. 7 is a schematic diagram in which a QAM modulation module sequentially maps modulation symbols to blocks according to an embodiment of this application.

For example, the QAM modulation module sequentially maps modulation symbols to blocks, and completes serial-to-parallel conversion. As shown in the left figure of FIG. 7, arrows from top to bottom indicate that modulation symbols in one block are sequentially mapped in a top-bottom sequence, and dashed arrows from left to right indicate a process of mapping modulation symbols between a plurality of blocks. To be specific, after modulation signals in one block are mapped, modulation symbols in a block on a right side adjacent to the block continue to be mapped. The black bold line part indicates a resource or a location reserved for a replication operation, and no QAM modulation symbol is mapped. After the modulation symbols are mapped to the blocks, the replication operation is performed. To be specific, some modulation symbols of a block are replicated to another adjacent block. The replication operation in this application is "forward replication", that is, a modulation symbol of a previous block is replicated to a next block. As shown in the right figure of FIG. 7, a direction indicated by an arrow 1 indicates that a first-type symbol component (namely, a shadow part shown by a left oblique line in the DMRS block) in a block 1 is copied to a block 2. A direction indicated by an arrow 2 indicates that a second-type symbol component (namely, a shadow part shown by a cross line in the DMRS block) in the block 1 is copied to the block 2. A direction indicated by an arrow 3 indicates that a third-type symbol component (namely, a shadow part shown by a vertical line in a data block 0) in the block 2 is copied to a block 3. A direction indicated by an arrow 4 indicates that a second-type symbol component (namely, a shadow part shown by a cross line in the data block 0) in the block 2 is copied to the block 3. A direction indicated by an arrow 5 indicates that a third-type symbol component (namely, a shadow part shown by a vertical line in the data block 1) in the block 3 is copied to a block 4. A direction indicated by an arrow 6 indicates that a second-type symbol component (namely, a shadow part shown by a cross line in the data block 1) in the block 3 is copied to the block 4.

The plurality of signal blocks have the following features: A first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k \geq 2$, and k is an integer.

For example, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on the duration of the NCP, m>1, X>1, X is an integer, and m is an integer. Duration of m modulation symbols is the same as or approximately equal to the duration of the NCP. For example, that the duration of the m modulation symbols is approximately equal to the duration of the NCP may be understood as that a difference between the duration of the m modulation symbols and the duration of the NCP is less than a preset threshold.

For ease of description, in the second signal block, the modulation symbols that are the same as the modulation symbols in the first-type symbol component in the first signal block are denoted as a symbol component P in the second signal block. That there are m−1 modulation symbols between a start modulation symbol of the symbol component P in the second signal block and the last modulation symbol of the second signal block may also be described as follows: The start symbol of the symbol component P in the second signal block and the last modulation symbol of the second signal block are separated by m−2 modulation symbols, where the m−2 modulation symbols do not include the start modulation symbol of the symbol component P in the second signal block, and do not include the last modulation symbol of the second signal block, and m−2$\geq$0.

A second-type symbol component in a $(k-1)^{th}$ signal block is last Y modulation symbols in the $(k-1)^{th}$ signal block, and in the $k^{th}$ signal block, there are m modulation symbols between an end modulation symbol of modulation symbols that are the same as modulation symbols in the second-type symbol component in the $(k-1)^{th}$ signal block and a last modulation symbol of the $k^{th}$ signal block, where $Y\geq1$, and Y is an integer. For ease of description, in the $k^{th}$ signal block, the modulation symbols that are the same as modulation symbols in the second-type symbol component in the $(k-1)^{th}$ signal block are denoted as a symbol component Q in the $k^{th}$ signal block. That there are m modulation symbols between an end modulation symbol of the symbol component Q in the $k^{th}$ signal block and the last modulation symbol of the $k^{th}$ signal block may also be described as follows: The end modulation symbol of the symbol component Q in the $k^{th}$ signal block and the last modulation symbol of the $k^{th}$ signal block are separated by $m-1$ modulation symbols, where the $m-1$ modulation symbols do not include the end modulation symbol of the symbol component Q in the $k^{th}$ signal block, and do not include the last modulation symbol of the $k^{th}$ signal block, and $m-1\geq0$.

The third-type symbol component in the $k^{th}$ signal block is first Z modulation symbols in the $k^{th}$ signal block, $Z<X$, $Z\geq1$, Z is an integer, and in the $(k+1)^{th}$ signal block, there are $m-1$ modulation symbols between a start modulation symbol of the modulation symbols that are the same as modulation symbols in the third-type symbol component in the $k^{th}$ signal block and a last modulation symbol of the $(k+1)^{th}$ signal block. For ease of description, in the $(k+1)^{th}$ signal block, the modulation symbols that are the same as the modulation symbols in the third-type symbol component in the $k^{th}$ signal block are denoted as a symbol component R in the $(k+1)^{th}$ signal block. That there are $m-1$ modulation symbols between a start modulation symbol of the symbol component R in the $(k+1)^{th}$ signal block and the last modulation symbol of the $(k+1)^{th}$ signal block may also be described as follows: The start modulation symbol of the symbol component R in the $(k+1)^{th}$ signal block and the last modulation symbol of the $(k+1)^{th}$ signal block are separated by $m-2$ modulation symbols, where the $m-2$ modulation symbols do not include the start modulation symbol of the symbol component R in the $(k+1)^{th}$ signal block, and do not include the last modulation symbol of the $(k+1)^{th}$ signal block, and $m-2\geq0$.

Figure 8:
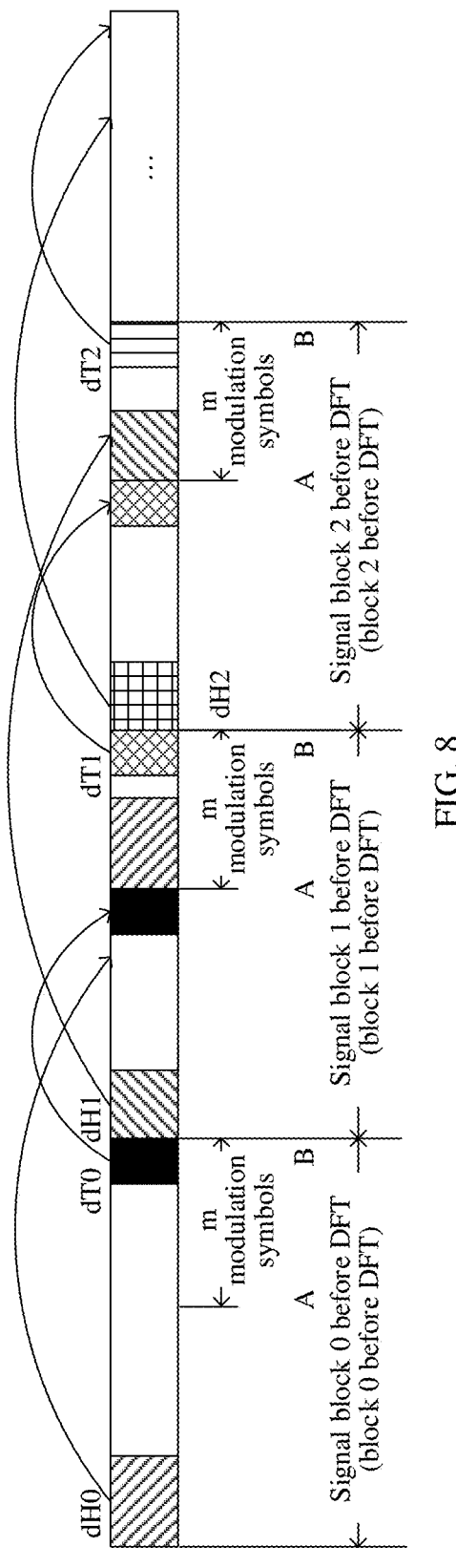
FIG. 8 is a schematic diagram of generating a signal block according to an embodiment of this application.

As shown in FIG. 8, three signal blocks are used as an example to describe a specific structure of the signal blocks obtained in this embodiment of this application.

There are m modulation symbols between boundary points A and B in each signal block, and the point B is an end location of a last modulation symbol of each signal block. Duration of the m modulation symbols is the same as the duration of the NCP. It may also be understood that a quantity of modulation symbols corresponding to the duration of the NCP is m, that is, the boundary point A of each block is a location of a modulation symbol corresponding to a start location of a CP.

A symbol component corresponding to a head frame of a first signal block is a first-type symbol component (corresponding to dH0 in FIG. 8), and a symbol component corresponding to a tail frame of the first signal block is a second-type symbol component (corresponding to dT0 in FIG. 8).

The first-type symbol component in the first signal block is copied to the right of a boundary point A of a second signal block, in other words, is used as a symbol component P in the second signal block. There are $m-1$ modulation symbols between a start modulation symbol of the symbol component P in the second signal block and a last modulation symbol of the second signal block. The start modulation symbol of the symbol component P in the second signal block refers to a first modulation symbol on the right of the point A in the second signal block. For example, if the start modulation symbol of the symbol component P in the second signal block is an $(n+1)^{th}$ modulation symbol in the second signal block, and the last modulation symbol of the second signal block is an $(m+n)^{th}$ modulation symbol in the second signal block, there are $[(m+n)-(n+1)]$ modulation symbols between the start modulation symbol of the symbol component P in the second signal block and the last modulation symbol of the second signal block.

The second-type symbol component in the first signal block is copied to the left of the boundary point A of the second signal block, in other words, is used as a symbol component Q in the second signal block. There are m modulation symbols between an end modulation symbol of the symbol component Q in the second signal block and the last modulation symbol of the second signal block. The end modulation symbol of the symbol component Q in the second signal block refers to a first modulation symbol on the left of the point A in the second signal block. For example, if the end modulation symbol of the symbol component Q in the second signal block is an $n^{th}$ modulation symbol in the second signal block, and the last modulation symbol of the second signal block is an $(m+n)^{th}$ modulation symbol in the second signal block, there are $[(m+n)-n]$ modulation symbols between the start modulation symbol of the symbol component Q in the second signal block and the last modulation symbol of the second signal block.

Therefore, the end modulation symbol of the symbol component Q in the second signal block and the start modulation symbol of the symbol component P in the second signal block are adjacent modulation symbols.

Similarly, a symbol component corresponding to a head frame of the second signal block is a third-type symbol component (corresponding to dH1 in FIG. 8), and a symbol component corresponding to a tail frame of the second signal block is a second-type symbol component (corresponding to dT1 in FIG. 8).

The third-type symbol component in the second signal block is copied to the right of a boundary point A of a third signal block, in other words, is used as a symbol component R in the third signal block. There are $m-1$ modulation symbols between a start modulation symbol of the symbol component R in the third signal block and a last modulation symbol of the third signal block. The start modulation symbol of the symbol component R in the third signal block refers to a first modulation symbol on the right of the point A in the third signal block.

The second-type symbol component in the second signal block is copied to the left of the boundary point A of the third signal block, in other words, is used as a symbol component Q in the third signal block. There are m modulation symbols between an end modulation symbol of the symbol component Q in the third signal block and the last modulation symbol of the third signal block.

Step 520: The terminal device processes each of the plurality of signal blocks to obtain an OFDM symbol corresponding to the signal block.

That the terminal device processes each of the plurality of signal blocks may mean that the following operations need to be sequentially performed on each signal block: DFT, RE mapping, IFFT, and CP addition. For details, refer to related content shown in FIG. 2B. Details are not described again.

Figure 9:
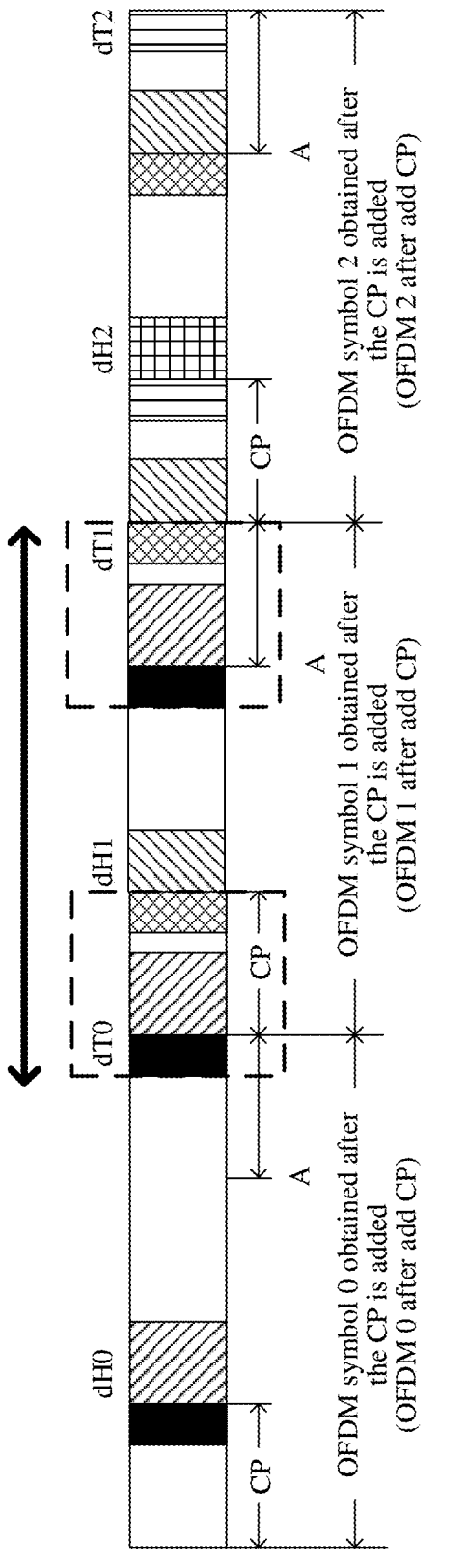
FIG. 9 is a schematic diagram of a time domain symbol obtained after a CP is added to an OFDM symbol according to an embodiment of this application.

FIG. 9 is a schematic diagram in which an OFDM symbol is obtained after DFT, RE mapping, and IFFT processing are performed on the signal block shown in FIG. 8 and a CP is added to the OFDM symbol to obtain a time domain symbol, where a dashed box represents a signal corresponding to an equivalent CP.

It can be learned from the foregoing analysis that, signals corresponding to the thick dashed line box in FIG. 9 are the same, so that all corresponding signals in a time range of the thick solid line arrow implement a head-to-tail cycle feature, and a cycle length is a sum of the length of the NCP and a length of a signal corresponding to a tail frame (namely, the length of the second-type symbol component). In other words, it is equivalent to that duration of the equivalent CP is a sum of the duration of the NCP and the duration corresponding to the second-type symbol component, and duration of an equivalent CP of a second symbol is duration of one thick line box. Therefore, when channels experienced by a plurality of terminal devices have different delays, second-type symbol components with different lengths may be configured or set for the plurality of terminal devices, to implement an equivalent CP whose duration or length is flexibly adjustable.

The equivalent CP herein and the sum of the length of the second-type symbol component and the length of the NCP that are indicated by the second information have the same meaning, and may be mutually referenced.

The second-type symbol component is used to implement a flexible equivalent CP, and has a longer length than the NCP. The first-type symbol component and the third-type symbol component are used to ensure phase continuity at an edge of a receive window (a time range of a thick dashed line arrow in FIG. 9), so that a signal phase at the edge of the receive window is smoothly transited, and performance of an adjacent channel leakage power ratio (ACLR) is not affected.

Further, because the length of the first-type symbol component is greater than the length of the third-type symbol component, the receive window corresponding to the first OFDM symbol may be delayed, so that received signals that arrive at the first OFDM symbol through the path P can also be completely received by the receive window, and it is ensured that received signals that arrive through the first path can also be completely received, so as to reduce impact of a path whose length is longer than the length of the NCP on performance of the first OFDM symbol. A delay difference between the path P and the first path is greater than the duration of the NCP. In addition, a power difference between the path P and the first path is less than or equal to a specified threshold $P_{th}$ dB ($P_p-P_1 \leq P_{th}$ dB) or is greater than or equal to $-P_{th}$ dB ($P_p-P_1 \geq -P_{th}$ dB). $P_1$ is average power of the first path, $P_p$ is average power of the path P, and a value of $P_{th}$ may be 15.

In addition, it should be noted that, because the replication operation of obtaining the flexible CP is performed only between symbols in a slot, a signal in a current slot is not replicated to a next slot, and the signal in the current slot is not replicated to a previous slot.

Step 530: The terminal device sends the OFDM symbol.

For example, the terminal device may sequentially process each of the plurality of signal blocks to obtain the OFDM symbol corresponding to the signal block, and send the OFDM symbol. To be specific, the terminal device sends one OFDM symbol each time the OFDM symbol is obtained, and does not need to wait for processing of another signal block to be completed and send the OFDM symbol together with an OFDM symbol corresponding to the another signal. Alternatively, the terminal device sequentially processes each of the plurality of signal blocks to obtain OFDM symbols respectively corresponding to the plurality of signal blocks, and the terminal device sequentially sends the OFDM symbols respectively corresponding to the plurality of signal blocks in a time sequence.

Step 540: The network device determines a receive window corresponding to each of the plurality of OFDM symbols.

The receive window corresponding to each OFDM symbol is an FFT receive window corresponding to each OFDM symbol.

The network device may determine the receive window corresponding to the first OFDM symbol in but not limited to the following manners.

Manner A: The network device may determine, based on the length of the first-type symbol component, the receive window corresponding to the first OFDM symbol, where a start point of the receive window corresponding to the first OFDM symbol is associated with the length of the first-type symbol component.

Figure 10:
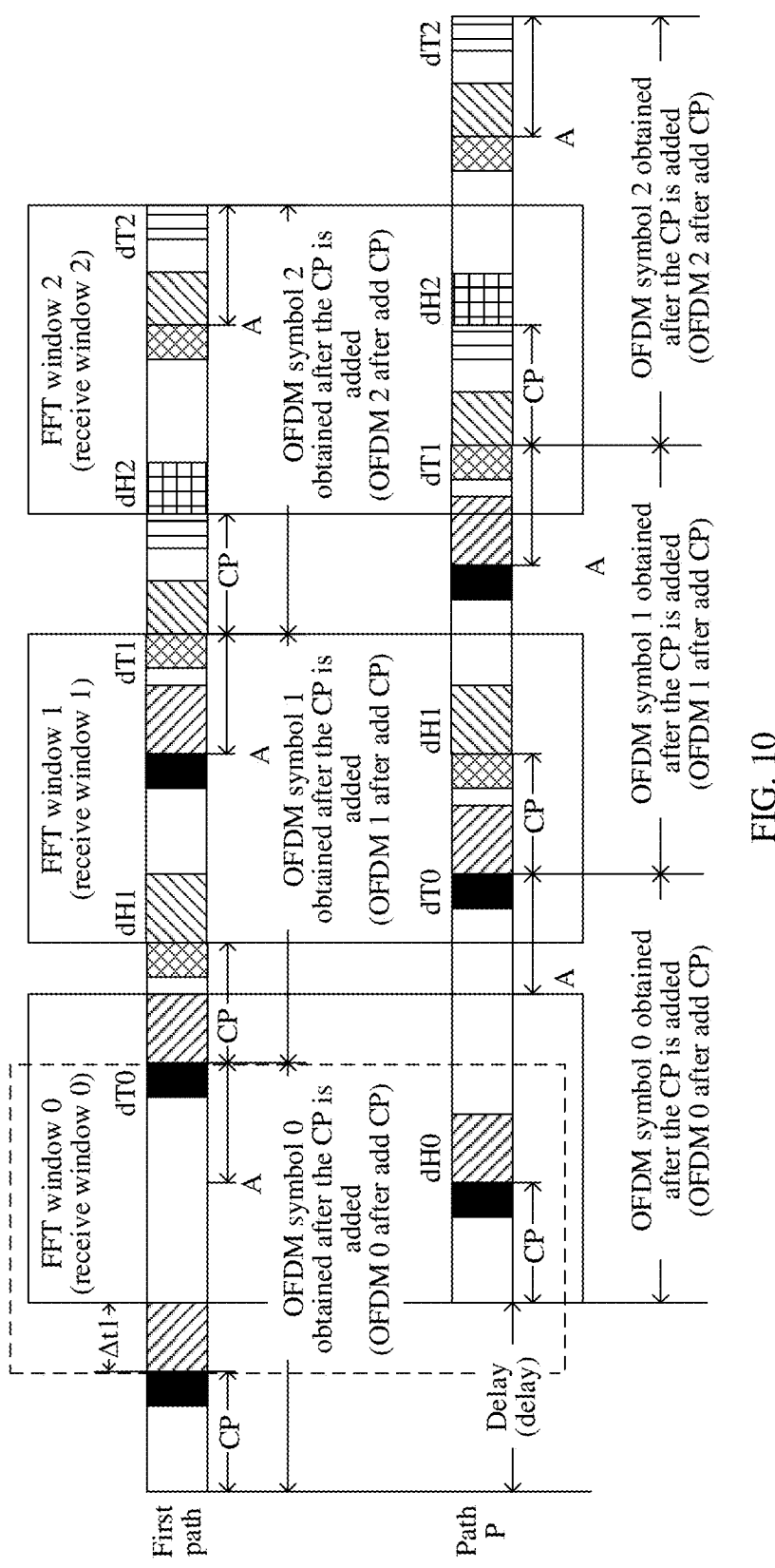
FIG. 10 is a schematic diagram 1 of a receive window of an OFDM symbol according to an embodiment of this application.

For example, the start point of the receive window corresponding to the first OFDM symbol may be a sampling point associated with a last modulation symbol of a first-type symbol component in the first OFDM symbol. As shown in FIG. 10, compared with a conventional FFT receive window (as shown in a dashed-line box), an FFT receive window of the first OFDM symbol has an overall delay of $\Delta t1$, which corresponds to $N_{delay1}$ sampling points obtained after IFFT (or before FFT). Herein, $\Delta t1$ and the $N_{delay1}$ sampling points obtained after IFFT (or before FFT) are determined based on the length of the first-type symbol component.

Manner B: The network device may determine, based on the difference between the length of the first-type symbol component and the length of the third-type symbol component, a first receive window corresponding to the first OFDM symbol, where a start point of a receive window corresponding to the first OFDM symbol is associated with the difference between the length of the first-type symbol component and the length of the third-type symbol component.

For example, a start point of a first receive window may be a sampling point that is in the first OFDM symbol and that is associated with the difference between the length of the first-type symbol component and the length of the third-type symbol component. Compared with a conventional FFT receive window, an FFT receive window of the first OFDM symbol has an overall delay of $\Delta t2$, which corresponds to $N_{delay2}$ sampling points obtained after IFFT (or before FFT). Herein, $\Delta t2$ and the $N_{delay2}$ sampling points obtained after IFFT (or before FFT) are determined based on the length of the first-type symbol component and the difference between the length of the first-type symbol component and the length of the third-type symbol component. Herein, $\Delta t1 > \Delta t2$, and $N_{delay1} > N_{delay2}$.

Manner C: The network device determines a plurality of candidate receive windows based on the length of the first-type symbol component or the difference between the length of the first-type symbol component and the length of the third-type symbol component, and the network device selects, from the plurality of candidate receive windows based on a preset parameter, one candidate receive window as the receive window corresponding to the first OFDM symbol.

For example, a spacing between any two adjacent start points in start points of the plurality of candidate receive windows is $\Delta T$ sampling points, $\Delta T$ is a preset value, and $\Delta T$ is a positive integer. The preset parameter may include but is not limited to one or more of noise power, a symbol error rate, a lowest bit error rate, and a mean squared error (MSE) of a QAM demodulation signal. Therefore, the network device may select, from signals obtained by using a plurality of receive windows corresponding to the first OFDM symbol, a receive window corresponding to a signal with smallest noise power, a lowest symbol error rate or bit error rate, or a smallest mean squared error of a QAM demodulation signal as a finally determined receive window corresponding to the first OFDM symbol.

For example, a sliding FFT receive window is determined for the first OFDM symbol. Starting from the conventional FFT receive window, $k*\Delta T$ sampling points obtained after IFFT (or before FFT) are delayed for a $k^{th}$ time, where $\Delta T$ is a sliding step of the sliding FFT receive window. Herein, $\Delta T$ may be determined based on $N_{delay1}$, $\Delta T=N_{delay1}/S$, and S is a quantity of times of sliding. The sliding FFT receive window may not include the conventional FFT receive window. It is assumed that S=3. A first sliding receive window is obtained after the conventional FFT receive window is delayed by $N_{delay1}/3$ sampling points obtained after IFFT (or before FFT). A second sliding receive window is obtained after the conventional FFT receive window is delayed by $2N_{delay1}/3$ sampling points obtained after IFFT (or before FFT). A third sliding receive window is obtained after the conventional FFT receive window is delayed by $N_{delay1}$ sampling points obtained after IFFT (or before FFT). Then, the network device selects an FFT receive window with optimal performance from the FFT receive windows as the FFT receive window corresponding to the first OFDM symbol. For example, a signal obtained by using the FFT receive window with optimal performance has smallest noise power, a lowest symbol error rate or bit error rate, or a smallest mean squared error of a QAM demodulation signal. Alternatively, the network device selects a first FFT receive window in which the first OFDM symbol can be correctly demodulated. For example, the network device may determine, in ascending order of values of k, a first FFT receive window in which the first OFDM symbol can be correctly demodulated as the FFT receive window corresponding to the first OFDM symbol.

It may be understood that Manner C may be further applied to a scenario in which the length of the first-type symbol component is the same as the length of the third-type symbol component.

It can be learned from the foregoing analysis that, if the conventional receive window is used, some signals that arrive at the first OFDM symbol through the path P (a path whose delay with the first path exceeds the NCP) fall outside the receive window, and some signals that arrive through the path P in a previous slot fall into the receive window. This affects performance of the first OFDM symbol. However, according to the method provided in this application, received signals that arrive at the first OFDM symbol through the path P can also be completely received by the receive window corresponding to the first OFDM symbol, to reduce impact of a path that exceeds the length of the NCP on the performance of the first OFDM symbol.

For OFDM symbols other than the first OFDM symbol, the network device may determine, based on the duration of the NCP, a receive window corresponding to each OFDM symbol. A spacing between an end point of the receive window corresponding to the first OFDM symbol and a start point of a receive window corresponding to the second OFDM symbol is T1 sampling points, a spacing between an end point of the receive window corresponding to the $k^{th}$ OFDM symbol and a start point of a receive window corresponding to a $(k+1)^{th}$ OFDM symbol is T2 sampling points, T1<T2, and T1 and T2 are positive integers. It may be understood that, due to a delay of the receive window corresponding to the first OFDM symbol, the spacing between the end point of the receive window corresponding to the first OFDM symbol and the start point of the receive window corresponding to the second OFDM symbol (referred to as a spacing between the receive window corresponding to the first OFDM symbol and the receive window corresponding to the second OFDM symbol below) is less than a spacing between other adjacent receive windows.

Step 550: The network device obtains a demodulation signal of each OFDM symbol based on the receive window corresponding to each OFDM symbol.

It may be understood that, after determining the receive window corresponding to each OFDM symbol, the network device may obtain an OFDM symbol obtained after the CP is removed based on the receive window corresponding to each OFDM symbol, then perform an FFT operation by using the OFDM symbol as a unit, that is, obtain an OFDM demodulation signal of each OFDM symbol, and continue subsequent channel equalization and DFT operations, to obtain a received signal in a unit of a block.

Further, the network device demodulates a received signal of each signal block based on the first-type symbol component, the second-type symbol component, and the third-type symbol component, to obtain received bit information.

It can be learned from the foregoing descriptions that some signals are transmitted twice in the entire slot, for example, transmitted once on the $k^{th}$ signal block and once on the $(k+1)^{th}$ signal block. However, it should be noted that, because signals are interfered in a transmission process, a received signal corresponding to the first-type symbol component and the second-type symbol component in the received signals of the first signal block is not completely the same as the first-type symbol component and the second-type symbol component in the first signal block. Similarly, because signals are interfered in the transmission process, although the second signal block includes modulation symbols that are the same as modulation symbols in the first-type symbol component and the second-type symbol component in the first signal block, a received signal corresponding to the first-type symbol component in the first signal block and a received signal corresponding to the second-type symbol component in the first signal block in the received signals of the second signal block are not completely the same as the received signal corresponding to the first-type symbol component and the received signal corresponding to the second-type-symbol component in the received signals of the first signal block.

It may be understood that, it can be learned from the foregoing that, for the transmit end, the signal block includes a plurality of modulation signals, and correspondingly, for the receive end, received signals of the signal block include received signals respectively corresponding to the plurality of modulation signals. Generally, in the signal transmission process, an arrangement sequence of the plurality of modulation symbols in the signal block is not changed. Therefore, an arrangement sequence of the received signals that are in the received signals of the signal block and that respectively correspond to the plurality of modulation signals are consistent with the arrangement sequence of the plurality of modulation symbols in the signal block. For example, the arrangement sequence of the plurality of modulation symbols in the signal block is a modulation symbol 1, a modulation symbol 2, and a modulation symbol 3. In this case, the arrangement sequence of the received signals that are in the received signals of the signal block and that respectively correspond to the plurality of modulated signals are a received signal corresponding to the modulation symbol 1, a received signal corresponding to the modulation symbol 2, and a received signal corresponding to the modulation symbol 3.

For example, the received signal is represented as $A(i,t)$ $=x(i,t)+n(i,t)$, where $x(i, t)$ is an $i^{th}$ QAM modulation symbol in a $t^{th}$ signal block sent by the transmit end (for example, a terminal device), $n(i, t)$ represents noise corresponding to the $i^{th}$ QAM modulation symbol in received signals of the $t^{th}$ signal block received by the receive end (for example, a network device), and $A(i, t)$ represents a received signal that corresponds to the $i^{th}$ QAM modulation symbol and that is in the received signals of the $t^{th}$ signal block.

Because noise on different QAM modulation symbols in received signals of different signal blocks is different, received signals corresponding to a same QAM modulation symbol in the received signals of the different signal blocks are different.

For ease of description, herein, the first-type symbol component and the second-type symbol component in the first signal block are denoted as $A_1$, the QAM modulation symbols that are in the second signal block and that are the same as modulation symbols in the first-type symbol component and the second-type symbol component in the first signal block are denoted as $B_1$, a received signal that is in the received signals of the first signal block and that corresponds to $A_1$ is denoted as $A_1^*$, and a received signal that is in the received signals of the second signal block and that corresponds to B, is denoted as $B_1^*$. $A_1$ is the same as $B_1$. Because signals are affected by interference and noise in the transmission process, $A_1^*$ is different from $A_1$, $B_1^*$ is different from $B_1$, and $A_1^*$ is different from $B_1^*$.

Similarly, the third-type symbol component and the second-type symbol component in the $k^{th}$ (k>1) signal block are denoted as $A_k$, the modulation symbols that are in the (k+1)th signal block and that are the same as modulation symbols in the third-type symbol component and the second-type symbol component in the $k^{th}$ signal block are denoted as $B_k$, a received signal that is in the received signals of the $k^{th}$ signal block and that corresponds to $A_k$ is denoted as $A_k^*$, and a received signal that is in the received signals of the $(k+1)^{th}$ signal block and that corresponds to $B_k$ is denoted as $B_k^*$. Ax is the same as $B_k$. Because signals are affected by interference and noise in the transmission process, $A_k^*$ is different from $A_k$, $B_k^*$ is different from $B_k$, and $A_k^*$ is different from $B_k^*$.

Therefore, after the received signals in the unit of a block are restored, the received signals of the signal block may be demapped in but not limited to the following manners.

Manner 1:

The network device performs demapping based on $A_1^*$, where $A_1^*$ is used to demodulate $A_1$.

The network device performs demapping based on $A_k^*$, where $A_k^*$ is used to demodulate $A_k$.

For example, after received signals of a plurality of signal blocks are determined, received signals that are of corresponding QAM modulation signals and that are on received signal blocks of the plurality of signal blocks are sequentially demapped (parallel-to-serial conversion) based on a receiving time sequence of the blocks and a mapping sequence of the QAM modulation symbols at the transmit end within a block. During demapping, $B_{1*}$, $B_2^*$, . . . , $B_k^*$, . . . , and $B_L^*$ are sequentially skipped. L is a total quantity of received signals of a signal block in one slot. Further, demodulation is completed based on demapped received signals of corresponding QAM modulation signals, to obtain received bit information. Demodulation of $A_k$ is completed based on a received signal of a corresponding QAM modulation signal obtained after $A_k^*$ is demapped, that is, a signal obtained after $A_k^*$ is demapped is placed in a sequence $S_{rx}$. A location of the signal obtained after $A_k^*$ is demapped in Six is the same as a location of the QAM modulation symbol corresponding to $A_k$ in a sequence $S_{tx}$, where Six represents a sequence formed by signals obtained after signal blocks in an entire slot are demapped, and $S_{tx}$ represents a sequence formed by all QAM modulation symbols that are to be mapped into a signal block in the entire slot.

Manner 2:

The network device performs demapping based on $B_1^*$, where $B_1^*$ is used to demodulate $A_1$.

The network device performs demapping based on $B_k^*$, where $B_k^*$ is used to demodulate $A_k$.

For example, after received signals of a plurality of signal blocks are determined, $A_k^*$ of a signal on a $k^{th}$ block is updated to $B_k^*$, and then received signals that correspond to QAM modulation signals and that are on received signal blocks of the plurality of signal blocks are sequentially demapped (parallel-to-serial conversion) based on a receiving time sequence of the blocks and a mapping sequence of the QAM modulation symbols at the transmit end within a block. During demapping, $B_{1*}$, $B_2^*$, . . . , $B_k^*$, . . . , and $B_L^*$ are sequentially skipped. L is a total quantity of received signals of a signal block in one slot. Further, demodulation is completed based on demapped received signals of corresponding QAM modulation signals, to obtain received bit information. Demodulation of $A_k$ is completed based on a received signal of a corresponding QAM modulation signal obtained after the updated $A_k^*$ is demapped, that is, a signal obtained after the updated $A_k^*$ is demapped is placed in a sequence $S_{rx}$. A location of the signal obtained after the updated $A_k^*$ is demapped in $S_{rx}$ is the same as a location of the QAM modulation symbol corresponding to $A_k$ in a sequence Sqam, where $S_{rx}$ represents a sequence formed by signals obtained after signal blocks in an entire slot are demapped, and $S_{tx}$ represents a sequence formed by all QAM modulation symbols that are to be mapped into a signal block in the entire slot.

Therefore, Manner 1 and Manner 2 indicate that a received signal of a modulation symbol corresponding to same information content needs to be demodulated only once, and demodulation does not need to be performed twice, so that demodulation efficiency can be improved.

Manner 3:

The network device performs demapping based on an average value of $A_1^*$ and $B_1^*$, where the average value of $A_r^*$ and $B_1^*$ is used to demodulate $A_1$.

The network device performs demapping based on an average value of $A_k^*$ and $B_k^*$, where the average value of $A_k^*$ and $B_k^*$ is used to demodulate $A_k$.

It may be understood that the average value herein may be alternatively replaced with a weighted average value or the like. This is not limited in this application.

For example, after received signals of a plurality of signal blocks are determined, where a received signal of a $k^{th}$ signal block is used as an example, $A_k^*$ on the received signal of the $k^{th}$ signal block is updated to an average value of $A_k^*$ and $B_k^*$. Remaining steps are the same as those in Manner 1. To be specific, received signals that correspond to QAM modulation signals and that are on received signal blocks of the plurality of signal blocks are sequentially demapped (parallel-to-serial conversion) based on a receiving time sequence of the blocks and a mapping sequence of the QAM modulation symbols at the transmit end within a block. During demapping, $B_1^*$, $B_2^*$, . . . , $B_k^*$, . . . , and $Br_L^*$ are sequentially skipped. L is a total quantity of received signals of a signal block in one slot. Further, demodulation is completed based on demapped received signals of corresponding QAM modulation signals, to obtain received bit information. Demodulation of $A_k$ is completed based on a received signal of a corresponding QAM modulation signal obtained after the updated $A_k^*$ is demapped, that is, a signal obtained after the updated $A_k^*$ is demapped is placed in a sequence $S_{rx}$. A location of the signal obtained after the updated $A_k^*$ is demapped in $S_{rx}$ is the same as a location of the QAM modulation symbol corresponding to $A_k$ in a sequence $S_{tx}$, where $S_{rx}$ represents a sequence formed by signals obtained after signal blocks in an entire slot are demapped, and St represents a sequence formed by all QAM modulation symbols that are to be mapped into a signal block in the entire slot.

Therefore, in Manner 3, demodulation is performed with reference to two parts of received signals of modulation symbols that correspond to same information content, so that a demodulation success rate can be improved.

Manner 4: When the network device determines that noise power of the received signals of the first signal block is lower than noise power of the received signals of the second signal block, the network device performs demapping based on $A_1^*$. When the network device determines that noise power of the received signals of the first signal block is higher than noise power of the received signals of the second signal block, the network device performs demapping based on $B_1^*$. For example, $A_1^*$ is updated to $B_1^*$ before demapping. $A_1^*$ and $B_1^*$ are used to demodulate $A_1$.

When the network device determines that noise power of the received signals of the $k^{th}$ signal block is lower than noise power of the received signals of the $(k+1)^{th}$ signal block, the network device performs demapping based on $A_k^*$. When the network device determines that noise power of the received signals of the $k^{th}$ signal block is higher than noise power of the received signals of the $(k+1)^{th}$ signal block, the network device performs demapping based on $B_k^*$. For example, $A_k^*$ is updated to $B_k^*$ before demapping. $A_k^*$ and $B_k^*$ are used to demodulate $A_k$.

Therefore, in Manner 4, received signals of a part of modulation symbols with lower noise power are selected for demodulation, so that a demodulation success rate can be increased.

It should be noted that, in Manner 1 to Manner 4, a compensation factor (used for decoding) of $A_k^*$($k{\geq}1$) corresponding to the $k^{th}$ signal block further needs to be updated at the same time. Each compensation factor update corresponds to a demodulation manner.

Manner 1: The compensation factor of $A_k^*$ is not updated, that is, the compensation factor based on $A_k^*$ in the equalization process is reserved as a final compensation factor.

Manner 2: The compensation factor of $A_k^*$ is updated to a compensation factor corresponding to $B_k^*$.

Manner 3: The compensation factor of $A_k^*$ is updated to a compensation factor corresponding to the average value of $A_k^*$ and $B_k^*$.

Manner 4: When the noise power of the received signals of the $k^{th}$ signal block is lower than the noise power of the received signals of the $(k+1)^{th}$ signal block, the compensation factor $A_k^*$ is not updated. When the noise power of the received signals of the $k^{th}$ signal block is higher than the noise power of the received signals of the $(k+1)^{th}$ signal block, the compensation factor of $A_k^*$ is updated to a compensation factor corresponding to $B_k^*$.

Further, the network device may determine the size of the transport block in a manner the same as that of the terminal device, determine information such as a redundancy code and a check code based on the size of the transport block, and decode the received bit information based on the information.

According to the method provided in embodiments of this application, the receive window corresponding to the first OFDM symbol may be delayed backwards compared with the conventional receive window, so that all signals that arrive at the first OFDM symbol through the path P may completely fall into the first receive window, to reduce inter-symbol interference on the first OFDM symbol. When the first OFDM symbol is a DMRS symbol, accuracy of channel estimation based on DMRS estimation is ensured, to further ensure modulation performance.

In addition, in some embodiments, a fourth-type symbol component is reserved on the first signal block, and there are m modulation symbols between an end modulation symbol of the fourth-type symbol component and the last modulation symbol of the first signal block. A value of m is determined based on the duration of the NCP, and m>1. A location of the fourth-type symbol component is similar to a location of a second-type symbol component corresponding to an OFDM symbol before mapping, and no signal is mapped to the fourth-type symbol component. According to the method, in the conventional receive window, useful information that arrives at the first OFDM symbol through the path P is not lost. In addition, a signal may be not mapped at a location of a second-type symbol component corresponding to a last OFDM symbol in a previous slot, to avoid impact of the signal on a first symbol in a next slot. In this case, all symbols may have a head component and a tail component of a same length. In other words, in this case, the length of the first-type symbol component is the same as the length of the third-type symbol component.

Figure 11:
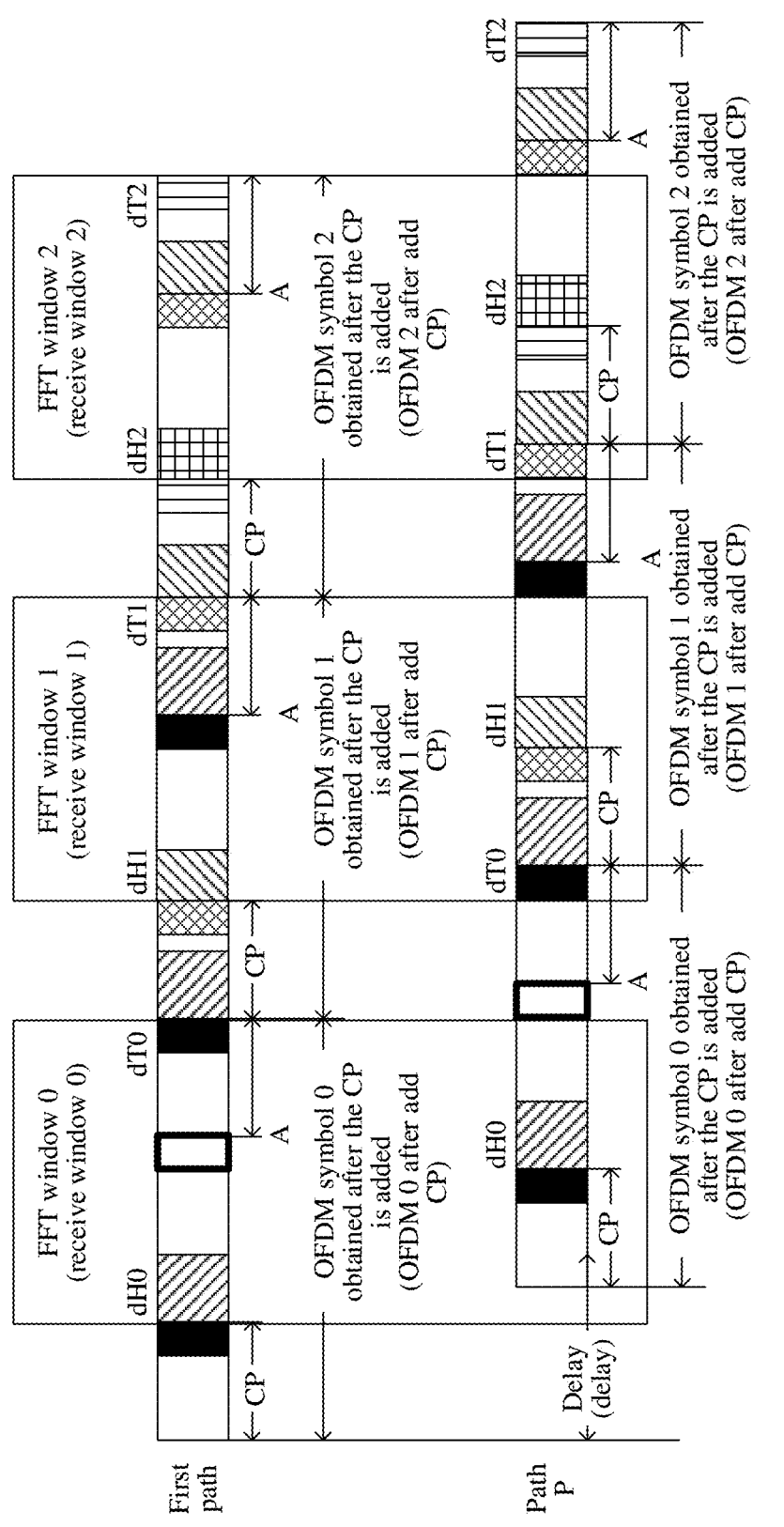
FIG. 11 is a schematic diagram 2 of a receive window of an OFDM symbol according to an embodiment of this application.

The solution of reserving the fourth-type symbol component on the first OFDM symbol may also be directly applied to a non-DMRS signal. When the first OFDM symbol is a DMRS signal, a special DMRS sequence may be designed, so that signal power at a location corresponding to a black bold box in FIG. 11 is low, to achieve a similar purpose. In addition, in the embodiment shown in FIG. 11, a receive window 0 is a conventional FFT receive window. In addition, a start point of the receive window 0 may be further located at a sampling point corresponding to a last modulation symbol of dH0. Alternatively, a start point of the receive window 0 may be any sampling point between a sampling point corresponding to a last modulation symbol of the CP and a sampling point corresponding to a last modulation symbol of dH0.

In addition, it may be understood that the method provided in the embodiment shown in FIG. 5 may also be applied to a case in which the network device sends an OFDM symbol to the terminal device. Herein, an example in which the terminal device sends the OFDM symbol to the network device is merely used for description.

Figure 12:
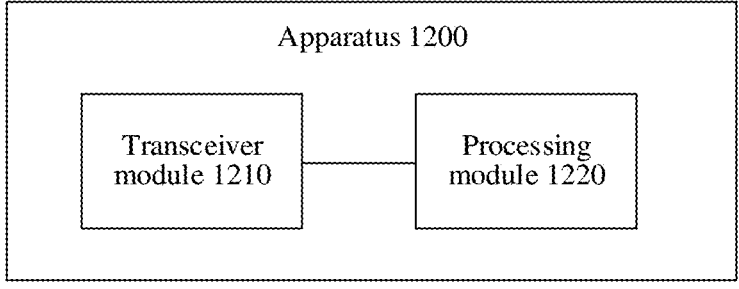
FIG. 12 is a schematic diagram 1 of a structure of an apparatus according to an embodiment of this application.

FIG. 12 is a possible example block diagram of an apparatus according to an embodiment of this application. An apparatus 1200 includes a transceiver module 1210 and a processing module 1220. The transceiver module 1210 may include a receiving unit and a sending unit. The processing module 1220 is configured to control and manage an action of the apparatus 1200. The transceiver module 1210 is configured to support the apparatus 1200 in communicating with another network entity. Optionally, the apparatus 1200 may further include a storage unit. The storage unit is configured to store program code and data of the apparatus 1200.

Optionally, each module in the apparatus 1200 may be implemented by using software.

Optionally, the processing module 1220 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits described with reference to content disclosed in embodiments of this application. The processor may be a combination of processors implementing a computing function, for example, a combination of one or more microprocessors, or a combination of the DSP and a microprocessor. The transceiver module 1210 may be a communication interface, a transceiver, a transceiver circuit, or the like. The communication interface is a general term. In a specific implementation, the communication interface may include a plurality of interfaces, and the storage unit may be a memory.

When the apparatus 1200 is a terminal device or a chip in a terminal device, the processing module 1220 in the apparatus 1200 may support the apparatus 1200 in performing the actions of the terminal device in the foregoing method examples, for example, may support the apparatus 1200 in performing step 510 and step 520 in FIG. 5.

The transceiver module 1210 may support communication between the apparatus 1200 and a network device. For example, the transceiver module 1210 may support the apparatus 1200 in performing step 500 and step 530 in FIG. 5.

For example, details may be as follows:

In an implementation, the apparatus 1200 includes:

the transceiver module 1210, configured to obtain first information and second information, where the first information is used to determine a length of a first-type symbol component, the second information is used to determine at least one of a length of a second-type symbol component and a length of a third-type symbol component, and the length of the first-type symbol component is greater than the length of the third-type symbol component; and the processing module 1220, configured to: determine a plurality of signal blocks based on the first information and the second information, where each signal block includes a plurality of modulation symbols; and process each of the plurality of signal blocks to obtain an OFDM symbol corresponding to the signal block.

A first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, k≥2, and k is an integer.

The transceiver module 1210 is configured to send the OFDM symbol.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1.

A second-type symbol component in a $(k−1)^{th}$ signal block is last Y modulation symbols in the $(k−1)^{th}$ signal block, and in the $k^{th}$ signal block, there are m modulation symbols between an end modulation symbol of modulation symbols that are the same as the modulation symbols in the second-type symbol component in the $(k−1)^{th}$ signal block and a last modulation symbol of the $k^{th}$ signal block, where Y≥1.

The third-type symbol component in the $k^{th}$ signal block is first Z modulation symbols in the $k^{th}$ signal block, Z<X, Z≥1, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, the length of the third-type symbol component is a first preset value.

The second information indicates a sum of the length of the second-type symbol component and a length of the cyclic prefix.

In a possible design, the first information indicates a difference between the length of the first-type symbol component and the length of the third-type symbol component.

In a possible design, the processing module 1220 is configured to: when determining the plurality of signal blocks based on the first information and the second information, determine a size of a transport block based on the first information and the second information; and determine, based on the size of the transport block, a plurality of signal blocks corresponding to third information, where the third information is information that needs to be sent by the terminal device to the network device.

In a possible design, the processing module 1220 is configured to: when determining the size of the transport block based on the first information and the second information, determine, based on the length of the first-type symbol component, a quantity of modulation symbols included in the first-type symbol component; determine, based on the length of the second-type symbol component, a quantity of modulation symbols included in the second-type symbol component; determine, based on the length of the third-type symbol component, a quantity of modulation symbols included in the third-type symbol component; determine a first resource element quantity based on the quantity of modulation symbols included in the first-type symbol component, the quantity of modulation symbols included in the second-type symbol component, and the quantity of modulation symbols included in the third-type symbol component, where the first resource element quantity indicates a quantity of resource elements corresponding to a same modulation symbol between different signal blocks in one slot; and determine the size of the transport block based on a second resource element quantity and the first resource element quantity, where the second resource element quantity is a quantity of resource elements used to transmit the third information in one slot.

In a possible design, the processing module 1220 is configured to: when determining the size of the transport block based on the second resource element quantity and the first resource element quantity, determine the size of the transport block based on a difference between the second resource element quantity and the first resource element quantity; or determine the size of the transport block based on a difference between the second resource element quantity and a first quantized value, where the first quantized value is obtained after the first resource element quantity is quantized at a preset spacing.

In a possible design, a unit of the length of the first-type symbol component is a quantity of sampling points obtained after IFFT, or an absolute time unit, or a quantity of sampling points obtained after IFFT is performed by using FFT points of a specified quantity; a unit of the length of the second-type symbol component is a quantity of sampling points obtained after IFFT, or an absolute time unit, or a quantity of sampling points obtained after IFFT is performed by using FFT points of a specified quantity; and a unit of the length of the third-type symbol component is a quantity of sampling points obtained after IFFT, or an absolute time unit, or a quantity of sampling points obtained after IFFT is performed by using FFT points of a specified quantity.

It should be understood that the apparatus 1200 according to this embodiment of this application may correspond to the terminal device in the foregoing method embodiments, and operations and/or functions of the modules in the apparatus 1200 are separately used to implement corresponding steps of the method of the terminal device in the foregoing method embodiments. Therefore, beneficial effects in the foregoing method embodiments can also be implemented. For brevity, details are not described herein again.

When the apparatus 1200 is a network device or a chip in a network device, the processing module 1220 in the apparatus 1200 may support the apparatus 1200 in performing the actions of the network device in the foregoing method examples, for example, may support the apparatus 1200 in performing step 540 and step 550 in FIG. 5.

The transceiver module 1210 may support communication between the apparatus 1200 and a terminal device. For example, the transceiver module 1210 may support the apparatus 1200 in performing step 500 and step 530 in FIG. 5.

For example, details may be as follows:

In an implementation, the apparatus 1200 includes:

the transceiver module 1210, configured to send first information and second information to the terminal device, where the first information is used to determine a length of a first-type symbol component, the second information is used to determine at least one of a length of a second-type symbol component and a length of a third-type symbol component, and the length of the first-type symbol component is greater than the length of the third-type symbol component, where the transceiver module 1210 is configured to receive a plurality of OFDM symbols from the terminal device, where the plurality of OFDM symbols are in a one-to-one correspondence with a plurality of signal blocks, each signal block includes a plurality of modulation symbols, a first signal block includes a first-type symbol component and a second-type symbol component, a second signal block includes modulation symbols that are the same as modulation symbols in the first-type symbol component and the second-type symbol component in the first signal block, a $(k+1)^{th}$ signal block includes modulation symbols that are the same as modulation symbols in a second-type symbol component and a third-type symbol component in a $k^{th}$ signal block, $k \geq 2$, and k is an integer; and the processing module 1220, configured to: determine a receive window corresponding to each of the plurality of OFDM symbols; and obtain a demodulation signal of each OFDM symbol based on the receive window corresponding to each OFDM symbol.

In a possible design, the first-type symbol component is first X modulation symbols in the first signal block, and in the second signal block, there are m−1 modulation symbols between a start modulation symbol of modulation symbols that are the same as the modulation symbols in the first-type symbol component in the first signal block and a last modulation symbol of the second signal block, where a value of m is determined based on duration of a cyclic prefix, m>1, and X>1.

A second-type symbol component in a $(k-1)^{th}$ signal block is last Y modulation symbols in the $(k-1)^{th}$ signal block, and in the $k^{th}$ signal block, there are m modulation symbols between an end modulation symbol of modulation symbols that are the same as the modulation symbols in the second-type symbol component in the $(k-1)^{th}$ signal block and a last modulation symbol of the $k^{th}$ signal block, where $Y \geq 1$.

The third-type symbol component in the $k^{th}$ signal block is first Z modulation symbols in the $k^{th}$ signal block, Z<X, $Z \geq 1$, and in the $(k+1)^{th}$ signal block, there are m−1 modulation symbols between a start modulation symbol of modulation symbols that are the same as the modulation symbols in the third-type symbol component in the $k^{th}$ signal block and a last modulation symbol of the $(k+1)^{th}$ signal block.

In a possible design, the processing module 1220 is configured to: when determining the receive window corresponding to each of the plurality of OFDM symbols, determine, based on the length of the first-type symbol component, a receive window corresponding to a first OFDM symbol in the plurality of OFDM symbols, where a start point of the receive window corresponding to the first OFDM symbol is associated with the length of the first-type symbol component; and determine, based on the duration of the cyclic prefix, a receive window corresponding to a $k^{th}$ symbol.

A spacing between an end point of the receive window corresponding to the first OFDM symbol and a start point of a receive window corresponding to a second OFDM symbol is T1 sampling points, a spacing between an end point of the receive window corresponding to the $k^{th}$ OFDM symbol and a start point of a receive window corresponding to a $(k+1)^{th}$ OFDM symbol is T2 sampling points, T1<T2, and T1 and T2 are positive integers.

In a possible design, the processing module 1220 is configured to: when determining, based on the length of the first-type symbol component, the receive window corresponding to the first OFDM symbol in the plurality of OFDM symbols, determine at least one candidate receive window based on the length of the first-type symbol component; and determine, from the at least one candidate receive window based on a preset parameter, the receive window corresponding to the first OFDM symbol, where a spacing between any two adjacent start points in start points of the at least one candidate receive window is ΔT sampling points, ΔT is a preset value, and ΔT is a positive integer.

In a possible design, the processing module 1220 is configured to: determine, based on the demodulation signal of each OFDM symbol, a received signal of a signal block corresponding to each OFDM symbol; demap, based on the first information and the second information, the received signal of the signal block corresponding to each OFDM symbol; and obtain received bit information based on a demapping result.

In a possible design, the processing module 1220 is configured to: when demapping, based on the first information and the second information, the received signal of the signal block corresponding to each OFDM symbol, perform demapping based on a received signal corresponding to the first-type symbol component and a received signal corresponding to the second-type symbol component in received signals of the first signal block, and perform demapping based on a received signal corresponding to the third-type symbol component and a received signal corresponding to the second-type symbol component in received signals of the $k^{th}$ signal block; or perform demapping, based on a received signal corresponding to the first-type symbol component in the first signal block and a received signal corresponding to the second-type symbol component in the first signal block in received signals of the second signal block, and perform demapping based on a received signal corresponding to the third-type symbol component in the $k^{th}$ signal block and a received signal corresponding to the second-type symbol component in the $k^{th}$ signal block in received signals of the $(k+1)^{th}$ signal block; or perform demapping based on an average value between a received signal corresponding to the first-type symbol component in received signals of the first signal block and a received signal corresponding to the first-type symbol component in the first signal block in received signals of the second signal block and an average value between a received signal corresponding to the second-type symbol component in the received signals of the first signal block and a received signal corresponding to the second-type symbol component in the first signal block in the received signals of the second signal block, and perform demapping based on an average value between a received signal corresponding to the third-type symbol component in received signals of the $k^{th}$ signal block and a received signal corresponding to the third-type symbol component in the $k^{th}$ signal block in received signals of the $(k+1)^{th}$ signal block and an average value between a received signal corresponding to the second-type symbol component in the received signals of the $k^{th}$ signal block and a received signal corresponding to the second-type symbol component in the $k^{th}$ signal block in the received signals of the $(k+1)^{th}$ signal block.

In a possible design, the processing module 1220 is configured to: when the received signal of the signal block corresponding to each symbol is demapped based on the first information and the second information, and when noise power of received signals of the $k^{th}$ signal block is lower than noise power of received signals of the $(k+1)^{th}$ signal block, perform demapping based on a received signal corresponding to the third-type symbol component and a received signal corresponding to the second-type symbol component in the received signals of the $k^{th}$ signal block; or when noise power of received signals of the $k^{th}$ signal block is higher than noise power of received signals of the $(k+1)^{th}$ signal block, perform demapping based on a received signal corresponding to the third-type symbol component in the $k^{th}$ signal block and a received signal corresponding to the second-type symbol component in the $k^{th}$ signal block in the received signals of the $(k+1)^{th}$ signal block.

It should be understood that the apparatus 1200 according to this embodiment of this application may correspond to the method of the network device in the foregoing method embodiments, and operations and/or functions of the modules in the apparatus 1200 are separately used to implement corresponding steps of the method of the network device in the foregoing method embodiments. Therefore, beneficial effects in the foregoing method embodiments can also be implemented. For brevity, details are not described herein again.

Figure 13:
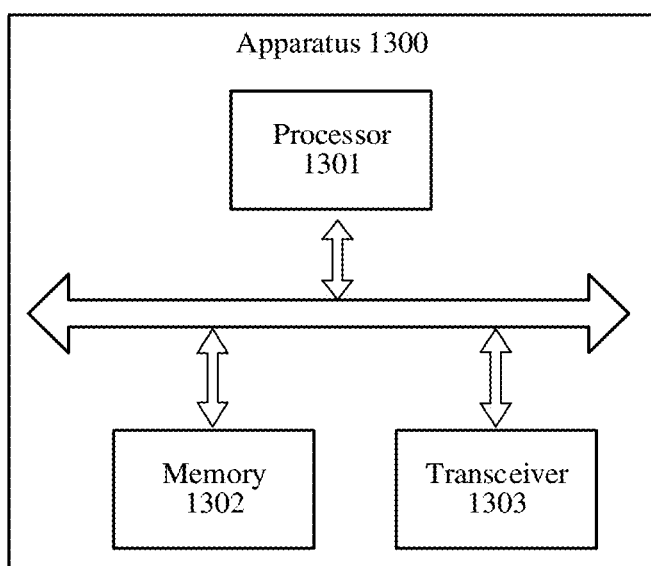
FIG. 13 is a schematic diagram 2 of a structure of an apparatus according to an embodiment of this application.

FIG. 13 is a schematic diagram of a structure of a communication apparatus 1300 according to an embodiment of this application. As shown in FIG. 13, the apparatus 1300 includes a processor 1301.

When the apparatus 1300 is a terminal device or a chip in a terminal device, in a possible implementation, the processor 1301 is configured to invoke an interface to perform the following actions:

obtaining first information and second information, where the first information is used to determine a length of a first-type symbol component, the second information is used to determine at least one of a length of a second-type symbol component and a length of a third-type symbol component, and the length of the first-type symbol component is greater than the length of the third-type symbol component; determining a plurality of signal blocks based on the first information and the second information, where each signal block includes a plurality of modulation symbols; processing each of the plurality of signal blocks to obtain an OFDM symbol corresponding to the signal block; and sending the OFDM symbol, where a first signal block includes a first-type symbol component and a second-type symbol component, a second signal block includes modulation symbols that are the same as modulation symbols in the first-type symbol component and the second-type symbol component in the first signal block, a (k+1)th signal block includes modulation symbols that are the same as modulation symbols in a second-type symbol component and a third-type symbol component in a $k^{th}$ signal block, k≥2, and k is an integer.

It should be understood that the apparatus 1300 may be further configured to perform other steps and/or operations on a terminal device side in the foregoing embodiments. For brevity, details are not described herein.

When the apparatus 1300 is a network device or a chip in a network device, in a possible implementation, the processor 1301 is configured to invoke an interface to perform the following actions:

sending first information and second information to a terminal device, where the first information is used to determine a length of a first-type symbol component, the second information is used to determine at least one of a length of a second-type symbol component and a length of a third-type symbol component, and the length of the first-type symbol component is greater than the length of the third-type symbol component; receiving a plurality of OFDM symbols from the terminal device, where the plurality of OFDM symbols are in a one-to-one correspondence with a plurality of signal blocks, each signal block includes a plurality of modulation symbols, a first signal block includes a first-type symbol component and a second-type symbol component, a second signal block includes modulation symbols that are the same as modulation symbols in the first-type symbol component and the second-type symbol component in the first signal block, a (k+1)$^{th}$ signal block includes modulation symbols that are the same as modulation symbols in a second-type symbol component and a third-type symbol component in a $k^{th}$ signal block, k≥2, and k is an integer; determining a receive window corresponding to each of the plurality of OFDM symbols; and obtaining a demodulation signal of each OFDM symbol based on the receive window corresponding to each OFDM symbol.

It should be understood that the apparatus 1300 may be further configured to perform other steps and/or operations on a network device side in the foregoing embodiments. For brevity, details are not described herein.

It should be understood that the processor 1301 may invoke an interface to execute the foregoing sending/receiving action, and the invoked interface may be a logical interface or a physical interface. This is not limited. Optionally, the physical interface may be implemented by using a transceiver. Optionally, the apparatus 1300 further includes a transceiver 1303.

Optionally, the apparatus 1300 further includes a memory 1302, and the memory 1302 may store program code in the foregoing method embodiment for invoking by the processor 1301.

Specifically, if the apparatus 1300 includes the processor 1301, the memory 1302, and the transceiver 1303, the processor 1301, the memory 1302, and the transceiver 1303 communicate with each other through an internal connection channel to transfer a control signal and/or a data signal. In a possible design, the processor 1301, the memory 1302, and the transceiver 1303 may be implemented by using a chip. The processor 1301, the memory 1302, and the transceiver 1303 may be implemented in a same chip, may be separately implemented in different chips, or any two functions are implemented in one chip. The memory 1302 may store program code. The processor 1301 invokes the program code stored in the memory 1302 to implement a corresponding function of the apparatus 1300.

The method disclosed in the foregoing embodiments of this application may be applied to the processor, or may be implemented by the processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, a discrete hardware assembly, a system on chip (SoC), a central processing unit (CPU), a network processor (NP), a digital signal processor (DSP), a micro controller unit (MCU), or a programmable logic device (PLD) or another integrated chip. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that memories of the systems and methods described in this specification include but are not limited to these and any memory of another proper type.

An embodiment of this application further provides a computer-readable storage medium. The computer-readable storage medium stores computer program code. When the computer program code is executed, the method in the foregoing method embodiments is performed.

An embodiment of this application further provides a computer program product. When the computer program product is run on a computer, the computer is enabled to perform the method in the foregoing method embodiments.

An embodiment of this application further provides a communication apparatus. The apparatus may exist in a product form of a chip. A structure of the apparatus includes a processor and an interface circuit. The processor is configured to communicate with another apparatus through a receiver circuit, so that the apparatus performs the method performed by the terminal device or the network device in the foregoing method embodiments.

An embodiment of this application further provides a wireless communication system, including a terminal device and a network device. The terminal device and the network device may perform the method in the foregoing method embodiments.

It should be understood that in embodiments of this application, numbers "first", "second", and the like are merely used to distinguish between different objects, for example, to distinguish between different parameter information or messages, and do not constitute a limitation on the scope of embodiments of this application. Embodiments of this application are not limited thereto.

It should be further understood that sequence numbers of the foregoing processes do not mean execution sequences in embodiments of this application. The execution sequences of the processes should be determined based on functions and internal logic of the processes. Various numerical numbers or sequence numbers involved in the foregoing processes are merely distinguished for ease of description, and should not constitute any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal device, the method comprising:

obtaining first information and second information, wherein the first information is used to determine a length of a first-type symbol component, the second information is used to determine at least one of a length of a second-type symbol component and a length of a third-type symbol component, and the length of the first-type symbol component is greater than the length of the third-type symbol component;

determining a plurality of signal blocks based on the first information and the second information, wherein each signal block of the plurality of signal blocks comprises a plurality of modulation symbols, wherein a first signal block of the plurality of signal blocks comprises the first-type symbol component and the second-type symbol component, a second signal block of the plurality of signal blocks comprises modulation symbols that are the same as modulation symbols in the first-type symbol component and the second-type symbol component in the first signal block, a $(k+1)^{th}$ signal block comprises modulation symbols that are the same as modulation symbols in a second-type symbol component and the third-type symbol component in a $k^{th}$ signal block, $k \geq 2$, and k is an integer;

processing each of the plurality of signal blocks to obtain an orthogonal frequency division multiplexing (OFDM) symbol corresponding to the signal block; and sending the OFDM symbol.

2. The method according to claim 1, wherein:

the first-type symbol component is first X modulation symbols in the first signal block, and the second signal block comprises m−1 modulation symbols between a start modulation symbol of modulation symbols that are the same as the modulation symbols in the first-type symbol component in the first signal block and a last modulation symbol of the second signal block, wherein a value of m is determined based on a duration of a cyclic prefix, m>1, and X>1;

a second-type symbol component in a $(k−1)^{th}$ signal block is last Y modulation symbols in the $(k−1)^{th}$ signal block, and the $k^{th}$ signal block comprises m modulation symbols between an end modulation symbol of modulation symbols that are the same as the modulation symbols in the second-type symbol component in the $(k−1)^{th}$ signal block and a last modulation symbol of the $k^{th}$ signal block, wherein $Y \geq 1$; and the third-type symbol component in the $k^{th}$ signal block is first Z modulation symbols in the $k^{th}$ signal block, Z<X, $Z \geq 1$, and the $(k+1)^{th}$ signal block comprises m−1 modulation symbols between a start modulation symbol of modulation symbols that are the same as the modulation symbols in the third-type symbol component in the $k^{th}$ signal block and a last modulation symbol of the $(k+1)^{th}$ signal block.

3. The method according to claim 2, wherein:

the length of the third-type symbol component is a first preset value; and the second information indicates a sum of the length of the second-type symbol component and a length of the cyclic prefix.

4. The method according to claim 1, wherein the first information indicates a difference between the length of the first-type symbol component and the length of the third-type symbol component.

5. The method according to claim 1, wherein determining the plurality of signal blocks based on the first information and the second information comprises:

determining a size of a transport block based on the first information and the second information; and determining, based on the size of the transport block, a plurality of signal blocks corresponding to third information, wherein the third information is information that needs to be sent by the terminal device to a network device.

6. The method according to claim 5, wherein determining the size of the transport block based on the first information and the second information comprises:

determining, based on the length of the first-type symbol component, a quantity of modulation symbols comprised in the first-type symbol component;

determining, based on the length of the second-type symbol component, a quantity of modulation symbols comprised in the second-type symbol component;

determining, based on the length of the third-type symbol component, a quantity of modulation symbols comprised in the third-type symbol component;

determining a first resource element quantity based on the quantity of modulation symbols comprised in the first-type symbol component, the quantity of modulation symbols comprised in the second-type symbol component, and the quantity of modulation symbols comprised in the third-type symbol component, wherein the first resource element quantity indicates a quantity of resource elements corresponding to a same modulation symbol between different signal blocks in one slot; and determining the size of the transport block based on a second resource element quantity and the first resource element quantity, wherein the second resource element quantity is a quantity of resource elements used to transmit the third information in one slot.

7. The method according to claim 6, wherein determining the size of the transport block based on the second resource element quantity and the first resource element quantity comprises:

determining the size of the transport block based on a difference between the second resource element quantity and the first resource element quantity; or determining the size of the transport block based on a difference between the second resource element quantity and a first quantized value, wherein the first quantized value is obtained after the first resource element quantity is quantized at a preset spacing.

8. A method applied to a network device, the method comprising:

sending first information and second information to a terminal device, wherein the first information is used to determine a length of a first-type symbol component, the second information is used to determine at least one of a length of a second-type symbol component and a length of a third-type symbol component, and the length of the first-type symbol component is greater than the length of the third-type symbol component;

receiving a plurality of orthogonal frequency division multiplexing (OFDM) symbols from the terminal device, wherein the plurality of OFDM symbols are in a one-to-one correspondence with a plurality of signal blocks, each signal block comprises a plurality of modulation symbols, a first signal block comprises the first-type symbol component and the second-type symbol component, a second signal block comprises modulation symbols that are the same as modulation symbols in the first-type symbol component and the second-type symbol component in the first signal block, a $(k+1)^{th}$ signal block comprises modulation symbols that are the same as modulation symbols in a second-type symbol component and the third-type symbol component in a $k^{th}$ signal block, $k \geq 2$, and k is an integer;

determining a receive window corresponding to each of the plurality of OFDM symbols; and obtaining a demodulation signal of each OFDM symbol based on the receive window corresponding to each OFDM symbol.

9. The method according to claim 8, wherein:

the first-type symbol component is first X modulation symbols in the first signal block, and the second signal block comprises m−1 modulation symbols between a start modulation symbol of modulation symbols that are the same as the modulation symbols in the first-type symbol component in the first signal block and a last modulation symbol of the second signal block, wherein a value of m is determined based on a duration of a cyclic prefix, m>1, and X>1;

a second-type symbol component in a $(k−1)^{th}$ signal block is last Y modulation symbols in the $(k−1)^{th}$ signal block, and the $k^{th}$ signal block comprises m modulation symbols between an end modulation symbol of modulation symbols that are the same as the modulation symbols in the second-type symbol component in the $(k−1)^{th}$ signal block and a last modulation symbol of the $k^{th}$ signal block, wherein Y≥1; and the third-type symbol component in the $k^{th}$ signal block is first Z modulation symbols in the $k^{th}$ signal block, Z<X, Z≥1, and the $(k+1)^{th}$ signal block comprises m−1 modulation symbols between a start modulation symbol of modulation symbols that are the same as the modulation symbols in the third-type symbol component in the $k^{th}$ signal block and a last modulation symbol of the $(k+1)^{th}$ signal block.

10. The method according to claim 9, wherein determining the receive window corresponding to each of the plurality of OFDM symbols comprises:

determining, based on the length of the first-type symbol component, a receive window corresponding to a first OFDM symbol in the plurality of OFDM symbols, wherein a start point of the receive window corresponding to the first OFDM symbol is associated with the length of the first-type symbol component; and determining, based on the duration of the cyclic prefix, a receive window corresponding to a $k^{th}$ OFDM symbol, wherein a spacing between an end point of the receive window corresponding to the first OFDM symbol and a start point of a receive window corresponding to a second OFDM symbol is T1 sampling points, a spacing between an end point of the receive window corresponding to the $k^{th}$ OFDM symbol and a start point of a receive window corresponding to a $(k+1)^{th}$ OFDM symbol is T2 sampling points, T1<T2, and T1 and T2 are positive integers.

11. The method according to claim 10, wherein determining, based on the length of the first-type symbol component, the receive window corresponding to the first OFDM symbol in the plurality of OFDM symbols comprises:

determining at least one candidate receive window based on the length of the first-type symbol component; and determining, based on a preset parameter, the receive window corresponding to the first OFDM symbol from the at least one candidate receive window, wherein a spacing between any two adjacent start points in start points of the at least one candidate receive window is $\Delta T$ sampling points, and $\Delta T$ is a preset value and is a positive integer.

12. The method according to claim 8, further comprising:

determining, based on the demodulation signal of each OFDM symbol, a received signal of a signal block corresponding to each OFDM symbol;

demapping, based on the first information and the second information, the received signal of the signal block corresponding to the OFDM symbol; and obtaining received bit information based on a demapping result.

13. The method according to claim 8, further comprising:

determining a size of a transport block based on the first information and the second information; and decoding received bit information based on the size of the transport block to obtain third information, wherein the third information is information that needs to be sent by the terminal device to the network device.

14. An apparatus for a terminal device or a chip in a terminal device, the apparatus comprising a processor and a memory with instructions stored thereon, wherein the instructions, when executed by the processor, enable the apparatus to:

obtain first information and second information, wherein the first information is used to determine a length of a first-type symbol component, the second information is used to determine at least one of a length of a second-type symbol component and a length of a third-type symbol component, and the length of the first-type symbol component is greater than the length of the third-type symbol component;

determine a plurality of signal blocks based on the first information and the second information, wherein each signal block of the plurality of signal blocks comprises a plurality of modulation symbols, a first signal block comprises the first-type symbol component and the second-type symbol component, a second signal block comprises modulation symbols that are the same as modulation symbols in the first-type symbol component and the second-type symbol component in the first signal block, a $(k+1)^{th}$ signal block comprises modulation symbols that are the same as modulation symbols in a second-type symbol component and the third-type symbol component in a $k^{th}$ signal block, $k \geq 2$, and k is an integer;

process each of the plurality of signal blocks to obtain an orthogonal frequency division multiplexing (OFDM) symbol corresponding to the signal block; and send the OFDM symbol.

15. The apparatus according to claim 14, wherein:

the first-type symbol component is first X modulation symbols in the first signal block, and the second signal block comprises m−1 modulation symbols between a start modulation symbol of modulation symbols that are the same as the modulation symbols in the first-type symbol component in the first signal block and a last modulation symbol of the second signal block, wherein a value of m is determined based on a duration of a cyclic prefix, m>1, and X>1;

a second-type symbol component in a $(k-1)^{th}$ signal block is last Y modulation symbols in the $(k-1)^{th}$ signal block, and the $k^{th}$ signal block comprises m modulation symbols between an end modulation symbol of modulation symbols that are the same as the modulation symbols in the second-type symbol component in the $(k-1)^{th}$ signal block and a last modulation symbol of the $k^{th}$ signal block, wherein Y≥1; and the third-type symbol component in the $k^{th}$ signal block is first Z modulation symbols in the $k^{th}$ signal block, Z<X, Z≥1, and the $(k+1)^{th}$ signal block comprises m−1 modulation symbols between a start modulation symbol of modulation symbols that are the same as the modulation symbols in the third-type symbol component in the $k^{th}$ signal block and a last modulation symbol of the $(k+1)^{th}$ signal block.

16. The apparatus according to claim 15, wherein:

the length of the third-type symbol component is a first preset value; and the second information indicates a sum of the length of the second-type symbol component and a length of the cyclic prefix.

17. The apparatus according to claim 14, wherein the first information indicates a difference between the length of the first-type symbol component and the length of the third-type symbol component.

18. The apparatus according to claim 14, wherein the instructions, when executed by the processor, further enable the apparatus to, while determining the plurality of signal blocks based on the first information and the second information:

determine a size of a transport block based on the first information and the second information; and determine, based on the size of the transport block, a plurality of signal blocks corresponding to third information, wherein the third information is information that needs to be sent by the terminal device to a network device.

19. The apparatus according to claim 18, wherein the instructions, when executed by the processor, further enable the apparatus to:

while determining the size of the transport block based on the first information and the second information:

determine, based on the length of the first-type symbol component, a quantity of modulation symbols comprised in the first-type symbol component, determine, based on the length of the second-type symbol component, a quantity of modulation symbols comprised in the second-type symbol component, and determine, based on the length of the third-type symbol component, a quantity of modulation symbols comprised in the third-type symbol component;

determine a first resource element quantity based on the quantity of modulation symbols comprised in the first-type symbol component, the quantity of modulation symbols comprised in the second-type symbol component, and the quantity of modulation symbols comprised in the third-type symbol component, wherein the first resource element quantity indicates a quantity of resource elements corresponding to a same modulation symbol between different signal blocks in one slot; and determine the size of the transport block based on a second resource element quantity and the first resource element quantity, wherein the second resource element quantity is a quantity of resource elements used to transmit the third information in one slot.

20. The apparatus according to claim 19, wherein the instructions, when executed by the processor, further enable the apparatus to, while determining the size of the transport block based on the second resource element quantity and the first resource element quantity: determine the size of the transport block based on a difference between the second resource element quantity and the first resource element quantity; or determine the size of the transport block based on a difference between the second resource element quantity and a first quantized value, wherein the first quantized value is obtained after the first resource element quantity is quantized at a preset spacing.

\* \* \* \* \*